US012293891B2

(12) United States Patent
Otsuka et al.

(10) Patent No.: US 12,293,891 B2
(45) Date of Patent: May 6, 2025

(54) ELECTROMAGNETIC RELAY WITH DRIVESHAFT STOPPER

(71) Applicant: OMRON Corporation, Kyoto (JP)

(72) Inventors: Kohei Otsuka, Kyoto (JP); Ryota Minowa, Kyoto (JP); Hiroyuki Iwasaka, Kyoto (JP); Shinichi Ogawa, Kyoto (JP); Ayata Horie, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 37 days.

(21) Appl. No.: 18/263,345

(22) PCT Filed: Jan. 18, 2022

(86) PCT No.: PCT/JP2022/001551
§ 371 (c)(1),
(2) Date: Jul. 28, 2023

(87) PCT Pub. No.: WO2022/181117
PCT Pub. Date: Sep. 1, 2022

(65) Prior Publication Data
US 2024/0120165 A1 Apr. 11, 2024

(30) Foreign Application Priority Data
Feb. 26, 2021 (JP) ................................. 2021-029801

(51) Int. Cl.
*H01H 50/64* (2006.01)

(52) U.S. Cl.
CPC ................................. *H01H 50/641* (2013.01)

(58) Field of Classification Search
None
See application file for complete search history.

(56) References Cited

U.S. PATENT DOCUMENTS 5,892,194 A 4/1999 Uotome et al.
9,431,200 B2 * 8/2016 Choi ...................... H01H 50/30
(Continued)

FOREIGN PATENT DOCUMENTS

JP 52-2137 U 1/1977
JP H9-259728 A 10/1997
(Continued)

OTHER PUBLICATIONS

A copy of the International Search Report of International Application No. PCT/JP2022/001551 issued on Mar. 29, 2022.
(Continued)

*Primary Examiner* — Bernard Rojas
(74) *Attorney, Agent, or Firm* — SHINJYU GLOBAL IP

(57) ABSTRACT

An electromagnetic relay includes a fixed contact, a movable contact, a movable contact piece, a movable iron core, a drive shaft, a coil, and a stopper. The movable iron core is movable in a moving direction including a contact direction in which the movable contact approaches the fixed contact and a separation direction in which the movable contact separates from the fixed contact. The movable iron core includes a shaft hole extending in the moving direction. The drive shaft is connected to the movable contact piece. The drive shaft extends through the shaft hole. The drive shaft is fixed to the movable iron core. The coil generates a magnetic force to move the movable iron core in the moving direction. The stopper is connected to the drive shaft. The stopper restricts a movement of the movable iron core with respect to the drive shaft in the moving direction.

3 Claims, 27 Drawing Sheets

(56) References Cited

U.S. PATENT DOCUMENTS

| | | | | |
|---|---|---|---|---|
| 10,714,290 | B2 * | 7/2020 | Minowa | H01H 50/04 |
| 10,741,349 | B2 * | 8/2020 | Minowa | H01H 50/14 |
| 2013/0057369 | A1 | 3/2013 | Yano et al. | |
| 2013/0057377 | A1 | 3/2013 | Yano et al. | |
| 2013/0076464 | A1 | 3/2013 | Yano et al. | |
| 2013/0088311 | A1 | 4/2013 | Yano et al. | |
| 2013/0099880 | A1 | 4/2013 | Yano et al. | |
| 2013/0106542 | A1 | 5/2013 | Yano et al. | |
| 2013/0207753 | A1 | 8/2013 | Yano et al. | |
| 2013/0214883 | A1 | 8/2013 | Yano et al. | |
| 2013/0214884 | A1 * | 8/2013 | Ito | H01H 45/00 335/154 |
| 2013/0257568 | A1 | 10/2013 | Yano et al. | |
| 2019/0131093 | A1 | 5/2019 | Minowa et al. | |
| 2019/0148094 | A1 | 5/2019 | Mizuno et al. | |
| 2020/0176208 | A1 | 6/2020 | Mori et al. | |
| 2021/0272763 | A1 | 9/2021 | Mori et al. | |
| 2022/0108860 | A1 | 4/2022 | Matsushima et al. | |

FOREIGN PATENT DOCUMENTS

| | | | |
|---|---|---|---|
| JP | 2003-100190 | A | 4/2003 |
| JP | 2003-217420 | A | 7/2003 |
| JP | 2015-46275 | A | 3/2015 |
| JP | 2018-14173 | A | 1/2018 |
| JP | 2019-36434 | A | 3/2019 |
| JP | 2019-83171 | A | 5/2019 |
| JP | 2019-96474 | A | 6/2019 |
| JP | 2020-42933 | A | 3/2020 |
| JP | 2020-136102 | A | 8/2020 |
| WO | 2011/115059 | A1 | 9/2011 |

OTHER PUBLICATIONS

A copy of the Written Opinion of the International Searching Authority of International Application No. PCT/ JP2022/001551 issued on Mar. 29, 2022.

The Office Action for the corresponding Japanese application No. 2021-029801, issued on Jun. 4, 2024.

The Office Action for the corresponding Japanese application No. 2021-029801 drafted on Oct. 10, 2024.

* cited by examiner

ELECTROMAGNETIC RELAY WITH DRIVESHAFT STOPPER

CROSS-REFERENCE TO RELATED APPLICATION

This application is the U.S. National Phase of International Application No. PCT/JP2022/001551, filed on Jan. 18, 2022, which claims priority to Japanese Patent Application No. 2021-029801, filed on Feb. 26, 2021. The contents of both of these prior applications are incorporated herein by reference.

FIELD

The claimed invention relates to electromagnetic relays.

BACKGROUND

An electromagnetic relay includes a movable contact piece and a movable iron core connected to each other via a drive shaft (see, for example, Japanese Laid-open Patent Application Publication No. 2019-96474). A magnetic force generated by a coil moves the movable iron core. The drive shaft and the movable contact piece move together with the movable iron core. The contacts are thereby opened and closed.

SUMMARY

In the above electromagnetic relay, the drive shaft is fixed to the movable iron core by fixing means such as welding, screws, or caulking. When the fixing means is broken due to a factor such as heat or impact, the movement of the movable iron core is no longer transmitted to the drive shaft. Therefore, the contacts cannot be opened and closed. An object of the claimed invention is to enable an electromagnetic relay to operate even in a state in which a fixation between a drive shaft and a movable iron core is damaged.

An electromagnetic relay according to one aspect of the claimed invention includes a fixed contact, a movable contact, a movable contact piece, a movable iron core, a drive shaft, a coil, and a stopper. The movable contact faces the fixed contact. The movable contact piece is connected to the movable contact. The movable iron core is movable in a moving direction including a contact direction in which the movable contact approaches the fixed contact and a separation direction in which the movable contact separates from the fixed contact. The movable iron core includes a shaft hole extending in the moving direction. The drive shaft is connected to the movable contact piece. The drive shaft extends through the shaft hole. The drive shaft is fixed to the movable iron core. The coil generates a magnetic force that moves the movable iron core in the moving direction. The stopper is connected to the drive shaft. The stopper restricts a movement of the movable iron core relative to the drive shaft in the moving direction.

In the electromagnetic relay according to the present aspect, the stopper restricts the movement of the movable iron core relative to the drive shaft in the moving direction when the fixation between the drive shaft and the movable iron core is damaged. Therefore, even if the fixation between the drive shaft and the movable iron core is damaged, the drive shaft can move together with the movable iron core. As a result, the electromagnetic relay can be operated even when the fixation between the drive shaft and the movable iron core is damaged.

The stopper may be larger than the shaft hole. In this case, the stopper is retained in the shaft hole. Thereby, the stopper restricts the movement of the movable iron core in the moving direction with respect to the drive shaft.

The shaft hole may include a first hole segment and a second hole segment. The first hole segment may extend in the moving direction. The second hole segment may extend in the moving direction. The second hole segment may communicate with the first hole segment. The second hole segment may be larger than the first hole segment. The drive shaft may extend through the first hole segment. The stopper may be disposed in the second hole segment. The stopper may be larger than the first hole segment. In this case, the stopper is retained in the first hole segment. Thereby, the stopper restricts the movement of the movable iron core in the moving direction with respect to the drive shaft. Moreover, since the stopper is disposed in the second hole segment, the arrangement space for the stopper can be saved.

The electromagnetic relay may further includes an intermediate member. The intermediate member may be provided separately from the stopper. The intermediate member may be sandwiched between the stopper and the movable iron core. In this case, damage to the stopper or the movable iron core can be reduced.

The intermediate member may be made of a different material from the stopper. In this case, for example, by forming the intermediate member with a material softer than that of the stopper and the movable iron core, damage to the stopper or the movable iron core can be reduced.

The stopper may be formed integrally with the drive shaft. In this case, the number of assembly man-hours is reduced. The stopper may be provided separately from the drive shaft. In this case, it is easy to manufacture the drive shaft and the stopper.

The stopper may be in contact with the movable iron core. In this case, when the fixation between the drive shaft and the movable iron core is damaged, the stopper immediately restricts the movement of the movable iron core relative to the drive shaft in the moving direction.

The stopper may be spaced apart from the movable iron core in the moving direction. A distance between the stopper and the movable iron core in the moving direction may be smaller than a movable range of the movable iron core in the contact direction after the movable contact contacts the fixed contact. In this case, when the fixation between the drive shaft and the movable iron core is damaged, the stopper moves to a position where the stopper contacts the movable iron core and restricts the movement of the movable iron core with respect to the drive shaft in the moving direction at the position. The drive shaft thereby moves together with the movable iron core. Then, the drive shaft can be further moved in the contact direction from the state in which the movable contact is in contact with the fixed contact. Thereby, the contact force of the contacts can be ensured.

The stopper may be disposed in the contact direction with respect to the movable iron core. In this case, the stopper restricts movement of the movable iron core in the contact direction with respect to the drive shaft. Therefore, even if the fixation between the drive shaft and the movable iron core is damaged, the movable contact can contact the fixed contact.

The stopper may be disposed in the separation direction with respect to the movable iron core. In this case, the stopper restricts the movement of the movable iron core in the separation direction with respect to the drive shaft. Therefore, even if the fixation between the drive shaft and the movable iron core is damaged, the movable contact can separate from the fixed contact.

The stopper may be located in the movable iron core. In this case, the stopper restricts both the movement in the contact direction and the movement in the separation direction of the movable iron core with respect to the drive shaft. Therefore, even if the fixation between the drive shaft and the movable iron core is damaged, the movable contact can contact with the fixed contact, and the movable contact can separate from the fixed contact.

The stopper may include a first stopper portion and a second stopper portion. The first stopper portion may be disposed in the separation direction with respect to the movable iron core. The second stopper portion may be disposed in the contact direction with respect to the movable iron core. In this case, the first stopper portion restricts the movement of the movable iron core with respect to the drive shaft in the separation direction. The second stopper portion restricts movement of the movable iron core in the contact direction with respect to the drive shaft. Therefore, even if the fixation between the drive shaft and the movable iron core is damaged, the movable contact can contact the fixed contact, and the movable contact can separate from the fixed contact.

The movable iron core may include a slit. The slit may communicate with the shaft hole. The slit may extend in the moving direction and in a lateral direction perpendicular to the moving direction. In this case, the drive shaft can be easily attached to the movable iron core through the slit.

The movable iron core may include a plurality of split bodies divided on a dividing plane extending through the shaft hole. In this case, the drive shaft can be easily attached to the movable iron core by fixing the plurality of split bodies to each other with the drive shaft sandwiched between the plurality of split bodies.

DETAILED DESCRIPTION

Figure 1:
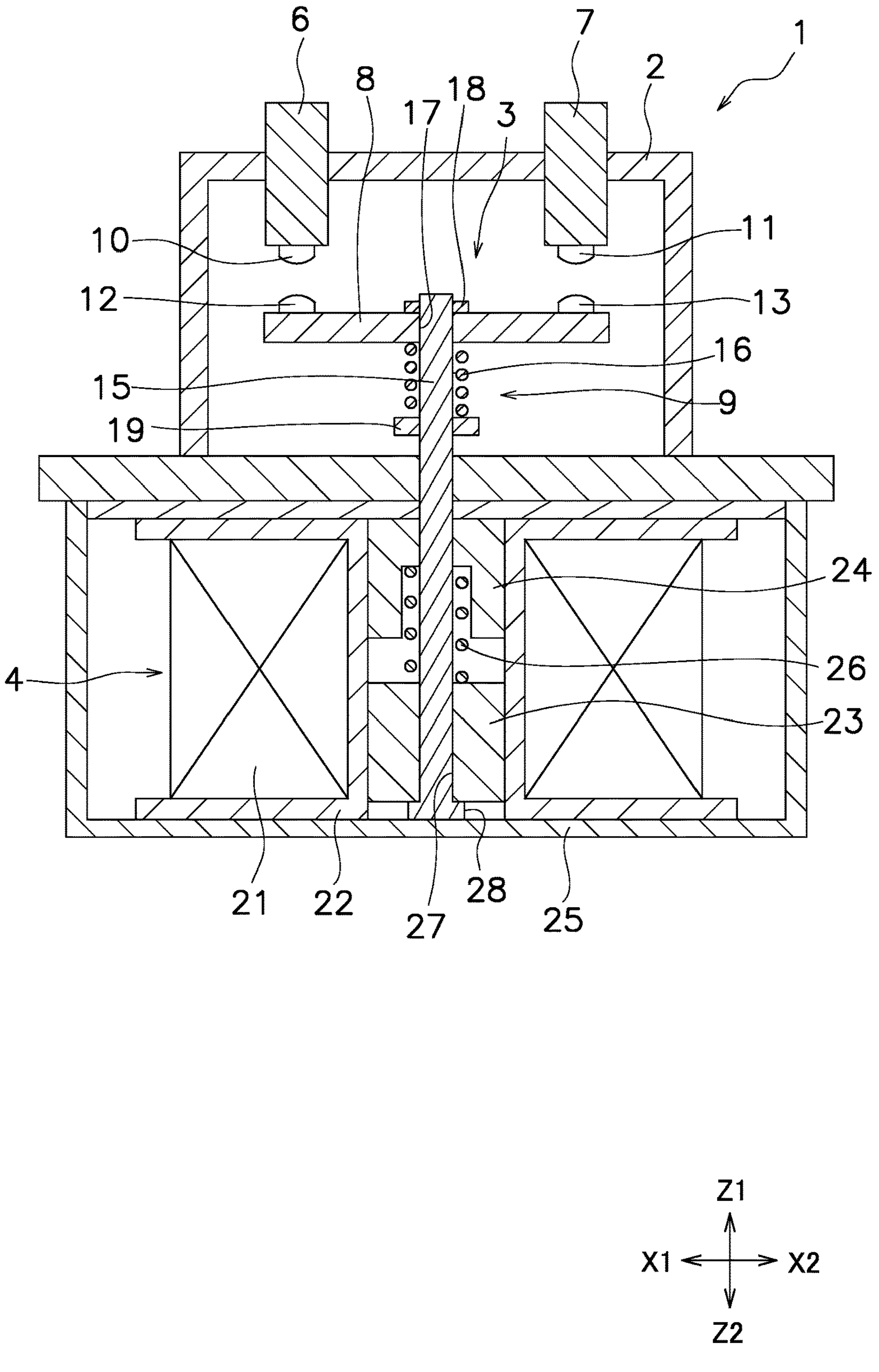
FIG. 1 is a section view of an electromagnetic relay according to a first embodiment.

Hereinafter, an embodiment of an electromagnetic relay 1 according to one aspect of the claimed invention will be described with reference to the drawings. FIG. 1 is a section view of an electromagnetic relay 1 according to a first embodiment. As shown in FIG. 1, the electromagnetic relay 1 includes a case 2, a contact device 3, and a drive device 4. The case 2 is made of an insulating material such as resin. However, the case 2 may be made of other materials such as ceramics. The contact device 3 is disposed in the case 2.

The contact device 3 includes a first fixed terminal 6, a second fixed terminal 7, a movable contact piece 8, a movable mechanism 9, a first fixed contact 10, a second fixed contact 11, a first movable contact 12, and the second movable contact 13.

In the following description, a direction from the first movable contact 12 to the first fixed contact 10 is defined as "contact direction (Z1)". The contact direction is a direction in which the movable contacts 12 and 13 approach the fixed contacts 10 and 11. A direction from the first fixed contact 10 to the first movable contact 12 is defined as "separation direction (Z2)". The separation direction is a direction in which the movable contacts 12 and 13 separate from the fixed contacts 10 and 11. A moving direction (Z1, Z2) include the contact direction (Z1) and the separation direction (Z2).

The first fixed terminal 6, the second fixed terminal 7, the movable contact piece 8, the first fixed contact 10, the second fixed contact 11, the first movable contact 12, and the second movable contact 13 are made of electrically conductive materials. For example, the first fixed terminal 6, the second fixed terminal 7, and the movable contact piece 8 may be made of metal materials known as terminal materials such as phosphor bronze, beryllium copper, brass, or tough pitch copper. However, the first fixed terminal 6, the second fixed terminal 7, and the movable contact piece 8 may be made of materials different from these materials. The first fixed contact 10, the second fixed contact 11, the first movable contact 12, and the second movable contact 13 are made of metal materials known as contact materials such as copper-based metal or silver-based metal.

The first fixed terminal 6 and the second fixed terminal 7 are spaced apart from each other in a lateral direction (X1, X2). The lateral direction (X1, X2) is a direction perpendicular to the moving direction (Z1, Z2). The first fixed contact 10 is connected to the first fixed terminal 6. The second fixed contact 11 is connected to the second fixed terminal 7. The first fixed contact 10 and the second fixed contact 11 are disposed in the case 2.

The movable contact piece 8, the first movable contact 12, and the second movable contact 13 are disposed in the case 2. The first movable contact 12 and the second movable contact 13 are connected to the movable contact piece 8. The first movable contact 12 faces the first fixed contact 10. The first movable contact 12 is configured to contact and separate from the first fixed contact 10. The second movable contact 13 faces the second fixed contact 11. The second movable contact 13 is configured to contact and separate from the second fixed contact 11. The first movable contact 12 is spaced apart from the second movable contact 13 in the lateral direction (X1, X2).

Figure 2:
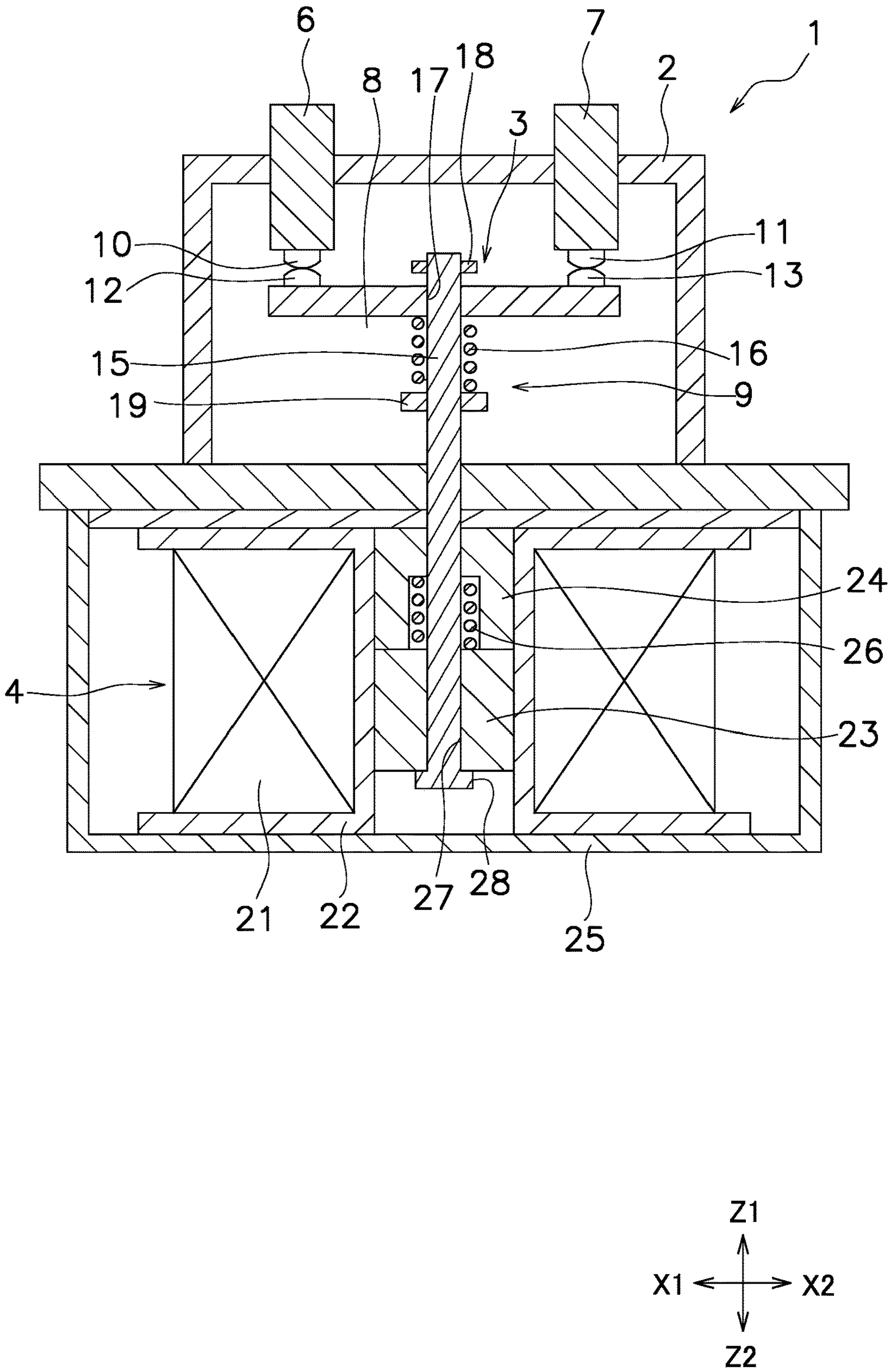
FIG. 2 is a section view of the electromagnetic relay according to the first embodiment.

The movable contact piece 8 is movable in the moving direction (Z1, Z2). That is, the movable contact piece 8 is movable in the contact direction (Z1) and the separation direction (Z2). The movable contact piece 8 is movable between a closed position and an open position. As shown in FIG. 1, when the movable contact piece 8 is at the open position, the movable contacts 12 and 13 are separated from the fixed contacts 10 and 11. As shown in FIG. 2, when the movable contact piece 8 is at the closed position, the movable contacts 12 and 13 are in contact with the fixed contacts 10 and 11.

The movable mechanism 9 supports the movable contact piece 8. The movable mechanism 9 includes a drive shaft 15 and a contact spring 16. The drive shaft 15 is connected to the movable contact piece 8. The drive shaft 15 extends in the moving direction (Z1, Z2) and extends through the movable contact piece 8 in the moving direction (Z1, Z2). The movable contact piece 8 includes a hole 17. The hole 17 extends in the moving direction (Z1, Z2) in the movable contact piece 8. The drive shaft 15 extends through the hole 17. The drive shaft 15 is movable together with the movable contact piece 8 in the moving direction (Z1, Z2). Further, the drive shaft 15 is movable in the moving direction (Z1, Z2) with respect to the movable contact piece 8.

A first holder 18 and a second holder 19 are fixed to the drive shaft 15. The movable contact piece 8 is disposed between the first holder 18 and the second holder 19. The first holder 18 and the second holder 19 are larger than the hole 17. The first holder 18 restricts a movement of the drive shaft 15 in the separation direction (Z2). The contact spring 16 is disposed between the movable contact piece 8 and the second holder 19. The contact spring 16 biases the movable contact piece 8 in the contact direction (Z1).

The drive device 4 includes a coil 21, a spool 22, a movable iron core 23, a fixed iron core 24, a yoke 25, and a return spring 26. The drive device 4 moves the movable contact piece 8 between the open position and the closed position via the movable mechanism 9 by an electromagnetic force. The coil 21 is wound around the spool 22. The movable iron core 23 and the fixed iron core 24 are disposed in the spool 22. The coil 21 generates a magnetic force that moves the movable iron core 23 in the moving direction.

The movable iron core 23 is connected to the drive shaft 15. The movable iron core 23 is movable in the moving direction (Z1, Z2). The fixed iron core 24 is disposed to face the movable iron core 23. The return spring 26 biases the movable iron core 23 in the separation direction (Z2).

The movable iron core 23 includes a shaft hole 27 extending in the moving direction (Z1, Z2). The shaft hole 27 penetrates the movable iron core 23 in the moving direction (Z1, Z2). The drive shaft 15 extends through the shaft hole 27. The drive shaft 15 is fixed to the movable iron core 23. The drive shaft 15 is fixed to the movable iron core 23 by welding, for example. However, the drive shaft 15 may be fixed to the movable iron core 23 by other fixing means such as screws or caulking.

A stopper 28 is connected to the drive shaft 15. The stopper 28 is connected to an end of the drive shaft 15. The stopper 28 is disposed in the separation direction (Z2) with respect to the movable iron core 23. The stopper 28 protrudes from the drive shaft 15 in a radial direction of the drive shaft 15. The stopper 28 is formed integrally with the drive shaft 15. The stopper 28 is in contact with the movable iron core 23. An outer shape of the stopper 28 is larger than an inner diameter of the shaft hole 27. The stopper 28 restricts the movement of the movable iron core 23 with respect to the drive shaft 15 in the separation direction (Z2).

Figure 3:
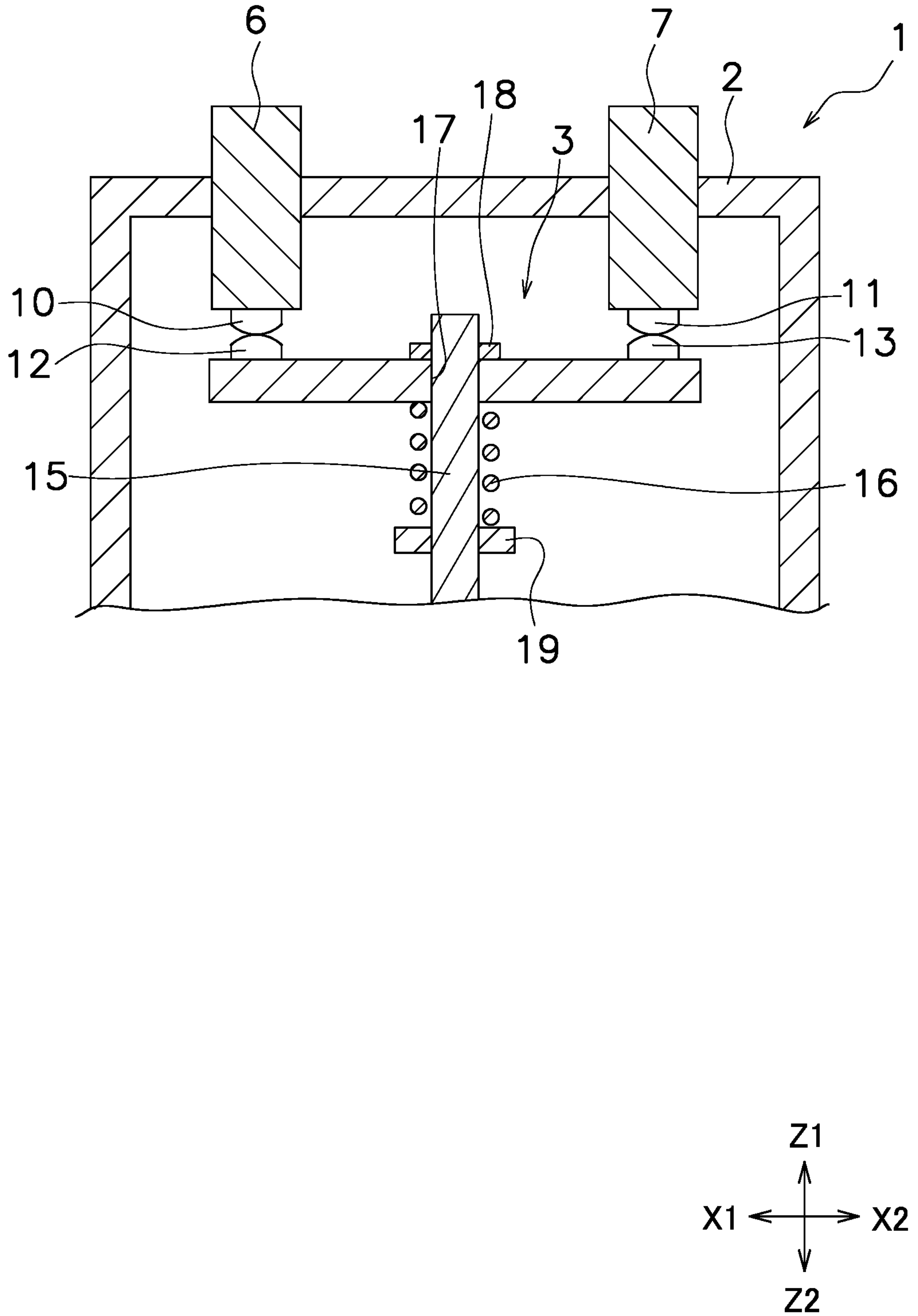
FIG. 3 is a section view of the electromagnetic relay according to the first embodiment.

In the electromagnetic relay 1, when the coil 21 is energized, the magnetic force generated by the magnetic field generated by the coil 21 attracts the movable iron core 23 toward the fixed iron core 24. Thereby, the movable iron core 23 and the drive shaft 15 move in the contact direction (Z1) against the biasing force of the return spring 26. As a result, the movable contact piece 8 moves in the contact direction (Z1), and as shown in FIG. 3, the first movable contact 12 contacts the first fixed contact 10 and the second movable contact 13 contacts the second fixed contact 11. After that, as the movable iron core 23 moves further in the contact direction (Z1), the drive shaft 15 moves in the contact direction (Z1) with respect to the movable contact piece 8, as shown in FIG. 2. Thereby, a high contact force is ensured between the movable contacts 12 and 13 and the fixed contacts 10 and 11 by compressing the contact spring 16.

When the coil 21 is de-energized, the movable iron core 23 and the drive shaft 15 are moved in the separation direction (Z2) by the biasing force of the return spring 26. As a result, the movable contact piece 8 moves to the open position shown in FIG. 1 and the movable contacts 12 and 13 separate from the fixed contacts 10 and 11.

In the electromagnetic relay 1 according to the first embodiment described above, when the fixation between the drive shaft 15 and the movable iron core 23 is damaged, the stopper 28 restricts the movement of the movable iron core 23 in the separation direction (Z2) with respect to the drive shaft 15. Therefore, even if the fixation between the drive shaft 15 and the movable iron core 23 is damaged, the drive shaft 15 can move in the separation direction (Z2) together with the movable iron core 23. As a result, in the electromagnetic relay 1, the movable contacts 12 and 13 can separate from the fixed contacts 10 and 11 even when the fixation between the drive shaft 15 and the movable iron core 23 is damaged.

Figure 4:
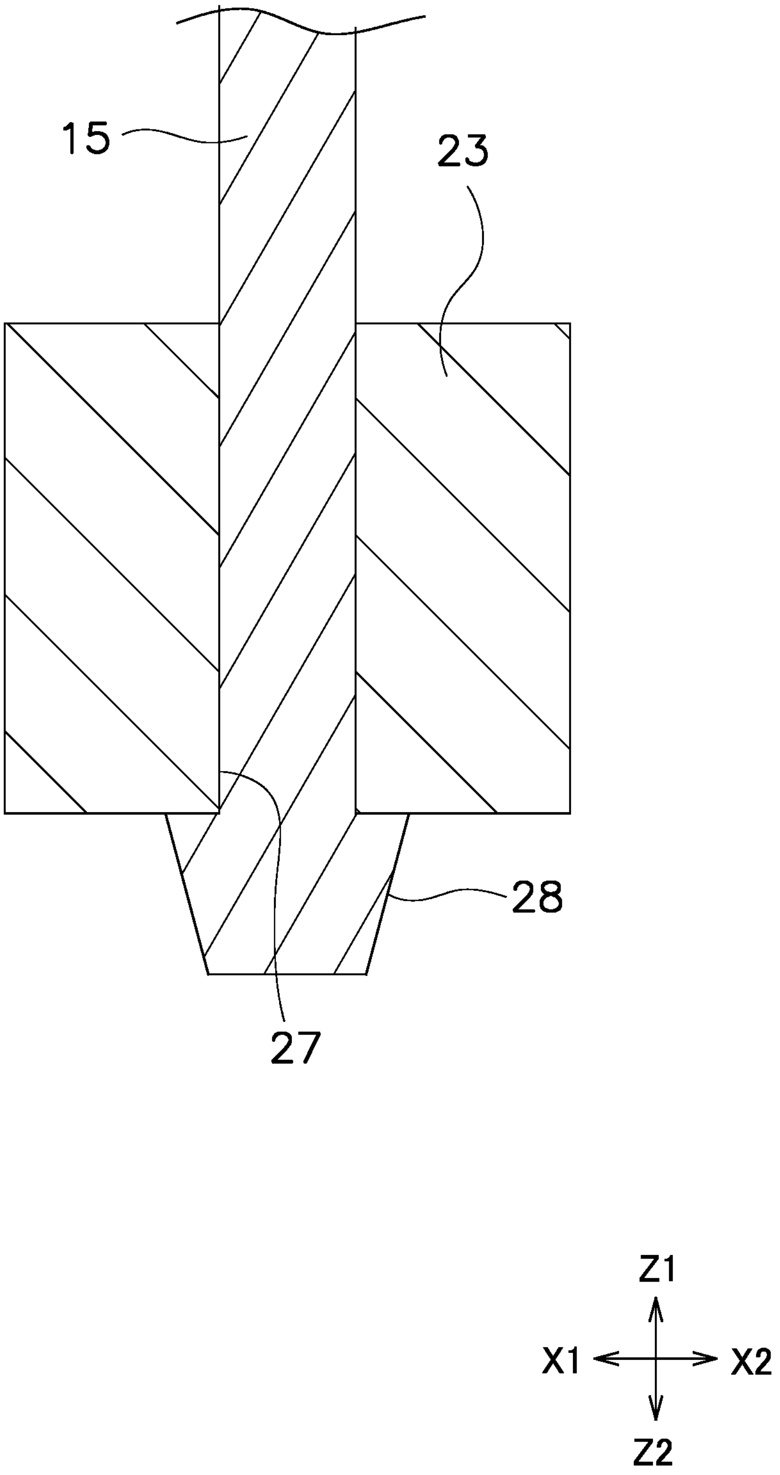
FIG. 4 is a section view showing a stopper according to a first modified example of the first embodiment.

Note that the shape of the stopper 28 is not limited to that described above, and may be changed. For example, FIG. 4 is a diagram showing the stopper 28 according to a first modified example of the first embodiment. As shown in FIG. 4, the stopper 28 may have a shape in which an external shape of the stopper 28 increases toward the contact direction (Z1).

Figure 5:
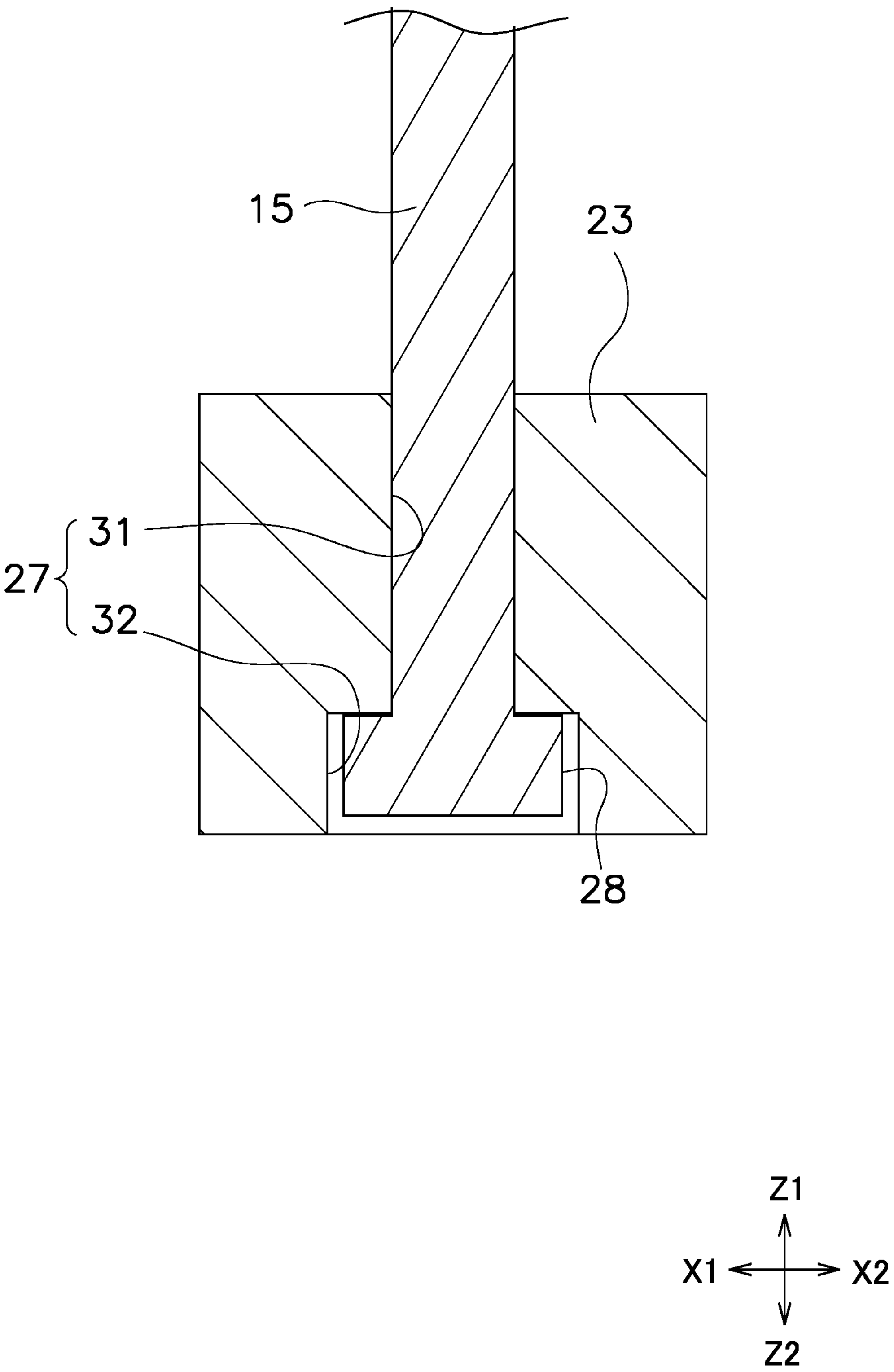
FIG. 5 is a section view showing a stopper according to a second modified example of the first embodiment.

FIG. 5 is a diagram showing the stopper 28 according to a second modified example of the first embodiment. As shown in FIG. 5, the shaft hole 27 may include a first hole segment 31 and a second hole segment 32. The first hole segment 31 may extend in the moving direction (Z1, Z2). The second hole segment 32 may be located in the separation direction (Z2) with respect to the first hole segment 31. The second hole segment 32 may extend in the moving direction (Z1, Z2) and communicate with the first hole segment 31. An inner diameter of the second hole segment 32 may be larger than an inner diameter of the first hole segment 31. The drive shaft 15 may extend through the first hole segment 31. An outer shape of the stopper 28 may be larger than the inner diameter of the first hole segment 31 but may be smaller than the inner diameter of the second hole segment 32. The stopper 28 may be disposed in the second hole segment 32.

Figure 6:
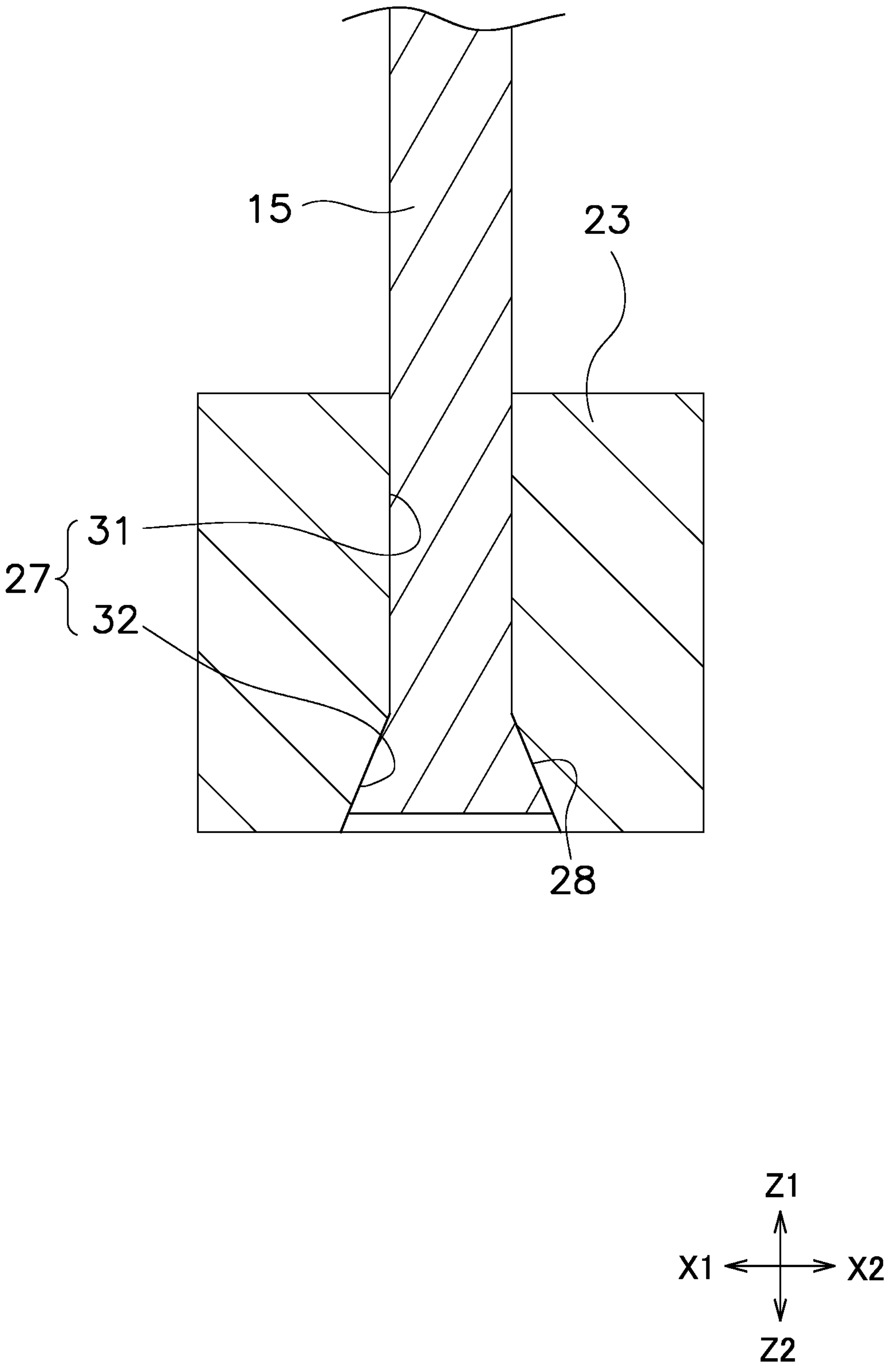
FIG. 6 is a section view showing a stopper according to a third modified example of the first embodiment.

FIG. 6 is a diagram showing the stopper 28 according to a third modified example of the first embodiment. As shown in FIG. 6, the inner diameter of the second hole segment 32 may expand toward the separation direction (Z2). The stopper 28 may have a shape along an inner surface of the second hole segment 32. That is, the outer shape of the stopper 28 may expand toward the separation direction (Z2).

Figure 7:
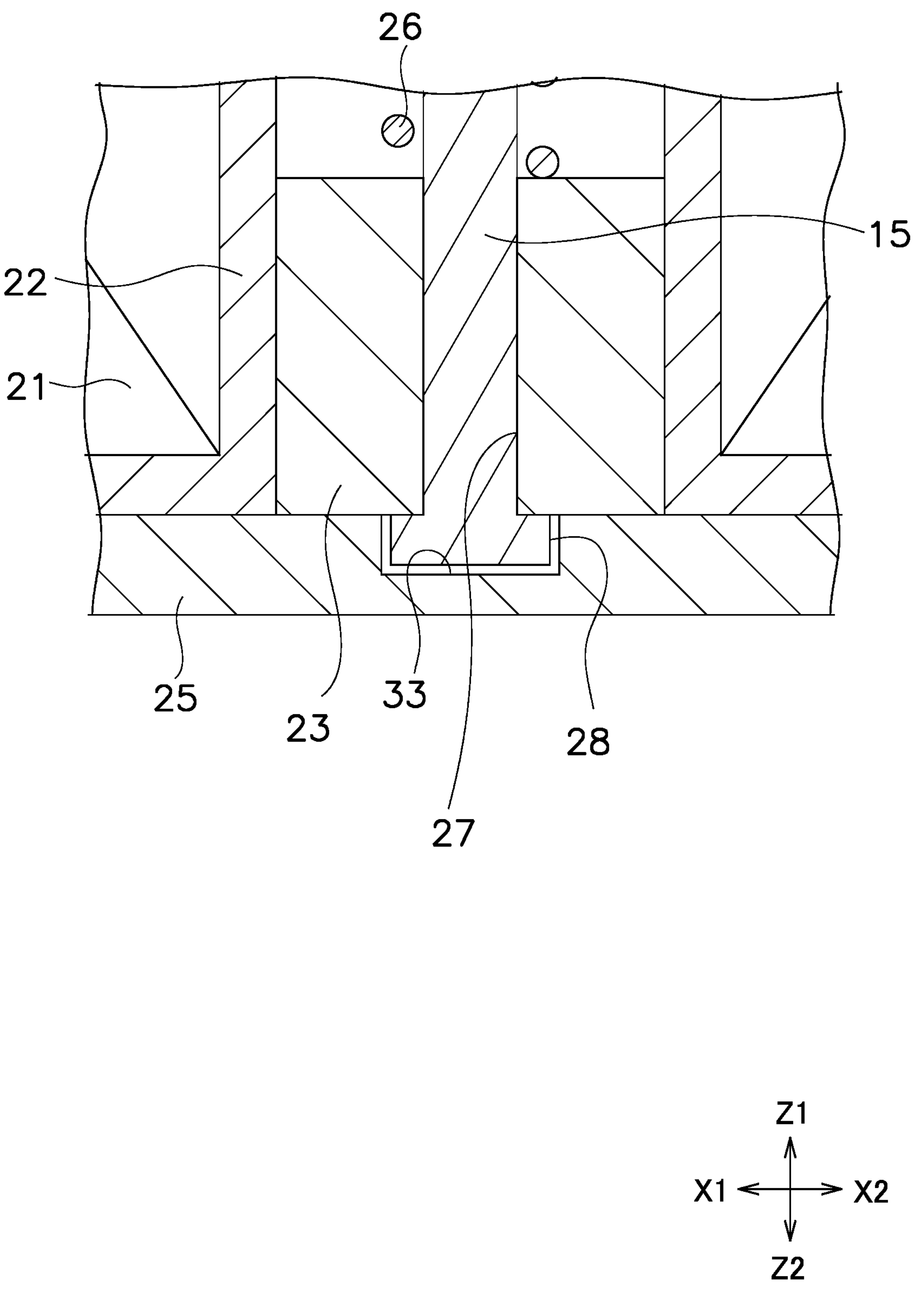
FIG. 7 is a section view showing a stopper according to a fourth modified example of the first embodiment.

FIG. 7 is a diagram showing the stopper 28 according to a fourth modified example of the first embodiment. The movable iron core 23 contacts the yoke 25 when the movable contact piece 8 is at the open position. The yoke 25 may include a recess 33, as shown in FIG. 7. When the movable contact piece 8 is at the open position, the stopper 28 may be located in the recess 33. Note that the movable iron core 23 may contact the case instead of the yoke 25 when the movable contact piece 8 is at the open position. In that case, the recess 33 may be provided in the case.

Figure 8:
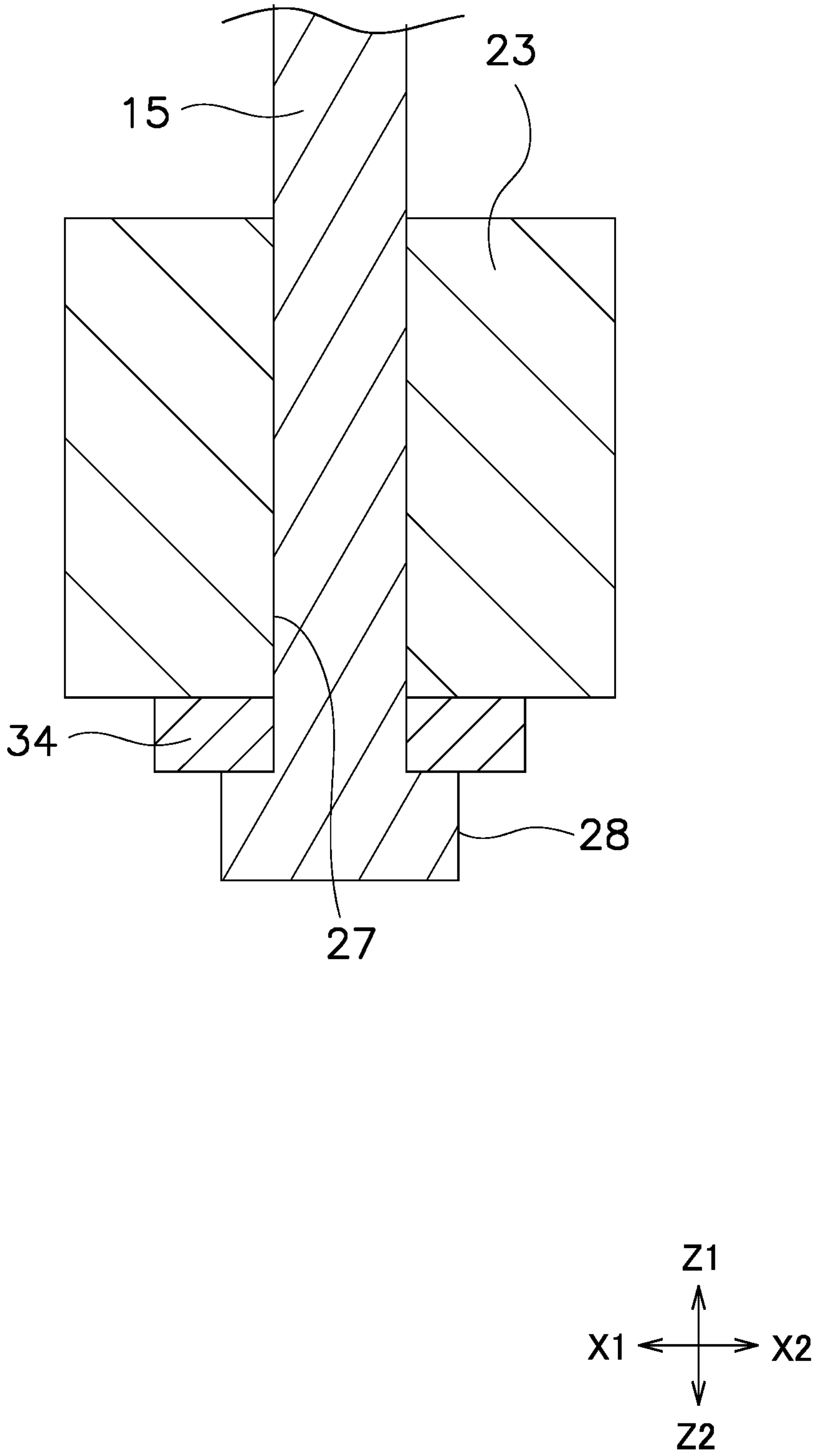
FIG. 8 is a section view showing a stopper according to a fifth modified example of the first embodiment.

FIG. 8 is a diagram showing the stopper 28 according to a fifth modified example of the first embodiment. As shown in FIG. 8, the electromagnetic relay 1 may further include an intermediate member 34. The intermediate member 34 may be provided separately from the stopper 28 and may be sandwiched between the stopper 28 and the movable iron core 23. The intermediate member 34 may be formed of a different material from the stopper 28. For example, the stopper may be made of metal and the intermediate member 34 may be made of resin. Alternatively, the stopper may be made of metal and the intermediate member 34 may be made of a softer metal than the stopper.

Figure 9A:
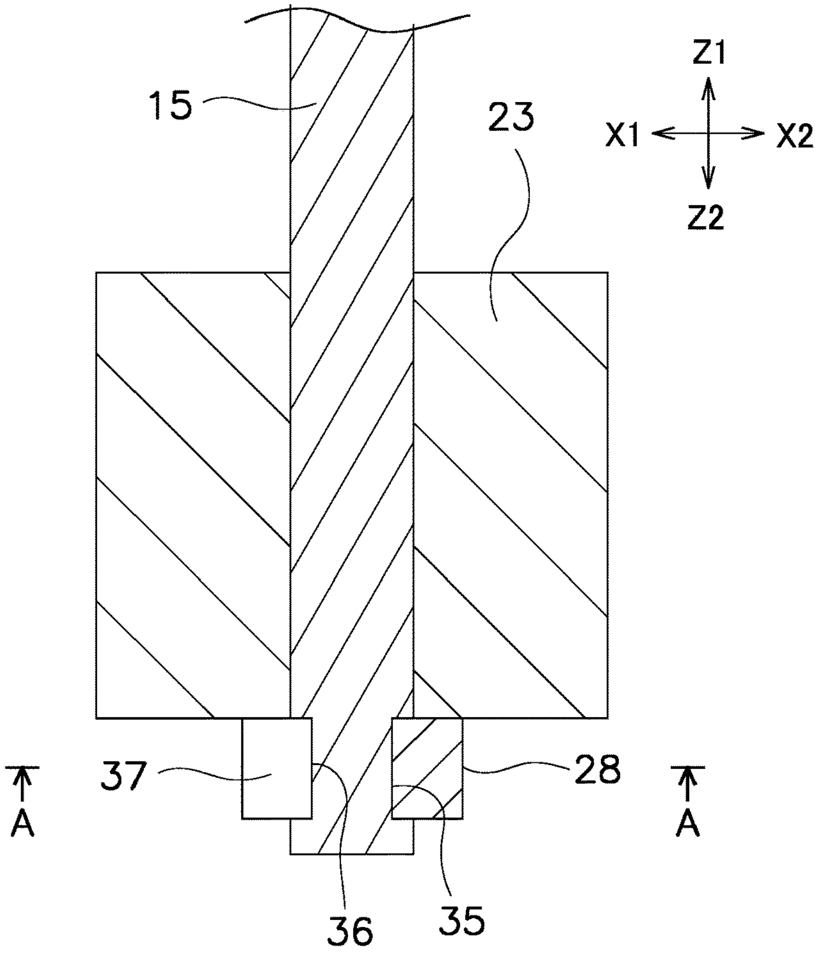
FIG. 9A is a section view showing a stopper according to a sixth modified example of the first embodiment.
Figure 9B:
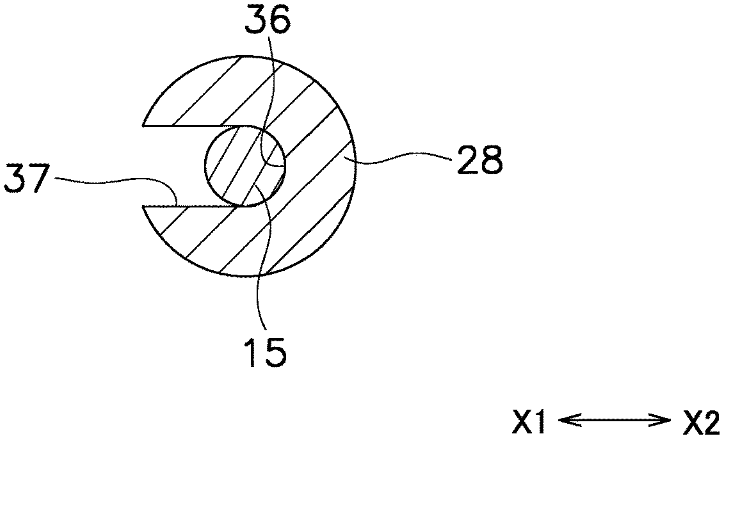
FIG. 9B is a section view showing the stopper according to the sixth modified example of the first embodiment.

FIGS. 9A and 9B are diagrams showing the stopper 28 according to a sixth modified example of the first embodiment. FIG. 9B is a section view along line AA in FIG. 9A. The stopper 28 may be provided separately from the drive shaft 15, as shown in FIG. 9A. The drive shaft 15 may include a groove 35. The stopper 28 may be attached to the drive shaft 15 by engaging with the groove 35. As shown in FIG. 9B, the stopper 28 may include a hole 36 and a slit 37 communicating with the hole 36. The slit 37 may extend in the lateral direction (X1, X2). The stopper 28 may be attached to the drive shaft 15 in the lateral direction (X1, X2) through the slit 37.

Figure 10A:
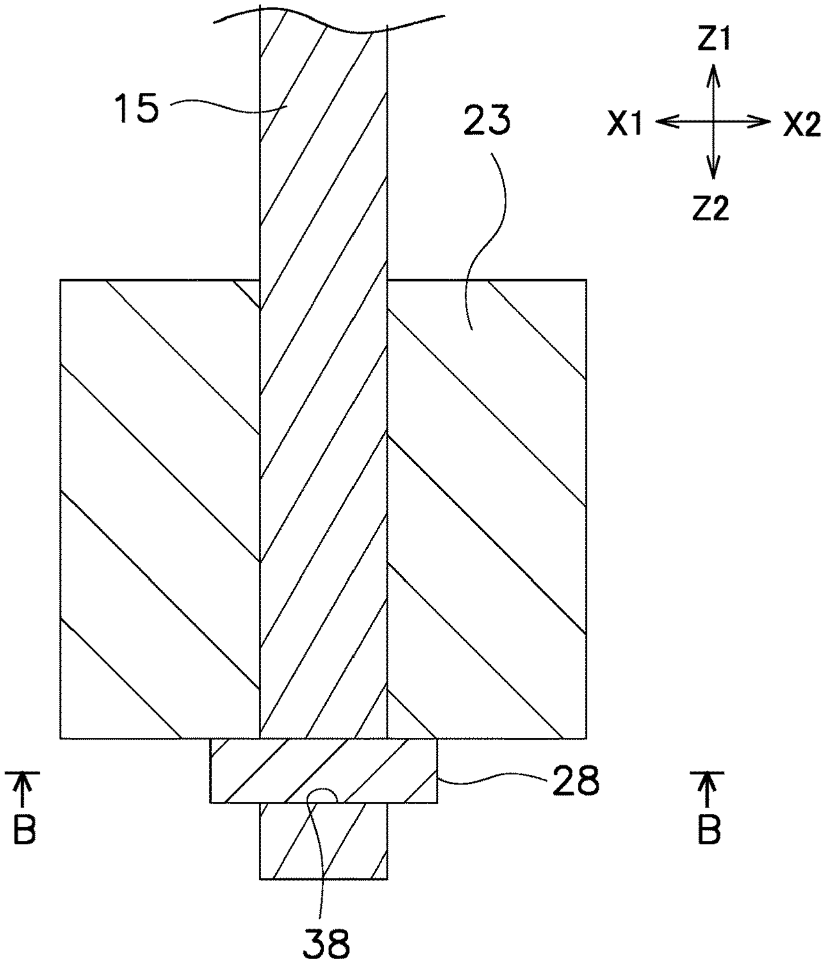
FIG. 10A is a section view showing a stopper according to a seventh modified example of the first embodiment.
Figure 10B:
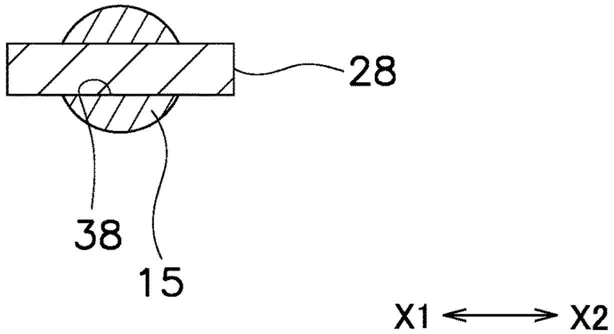
FIG. 10B is a section view showing the stopper according to the seventh modified example of the first embodiment.

FIGS. 10A and 10B are diagrams showing the stopper 28 according to a seventh modified example of the first embodiment. FIG. 10B is a section view along line BB in FIG. 10A. As shown in FIGS. 10A and 10B, the drive shaft 15 may include a holes 38 extending in the lateral direction (X1, X2). The stopper 28 may be inserted into the hole 38.

Figure 11:
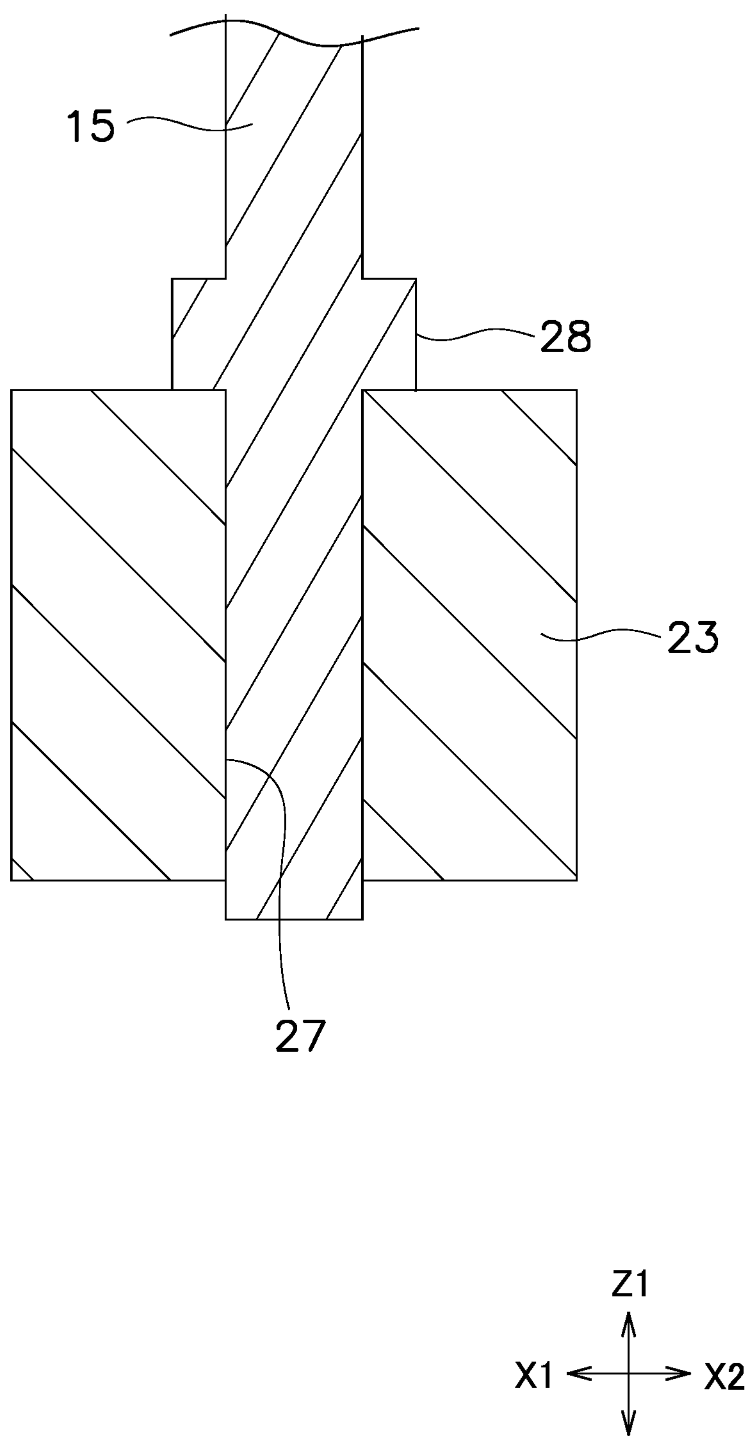
FIG. 11 is a section view showing a stopper according to a second embodiment.

Next, an electromagnetic relay 1 according to a second embodiment will be described. FIG. 11 is a section view showing the stopper 28 of the electromagnetic relay 1 according to the second embodiment. As shown in FIG. 11, in the electromagnetic relay 1 according to the second embodiment, the stopper 28 is disposed in the contact direction (Z1) with respect to the movable iron core 23. Other configurations of the electromagnetic relay 1 according to the second embodiment are the same as those of the electromagnetic relay 1 according to the first embodiment.

In the electromagnetic relay 1 according to the second embodiment, when the fixation between the drive shaft 15 and the movable iron core 23 is damaged, the stopper 28 restricts the movement of the movable iron core 23 with respect to the drive shaft 15 in the contact direction (Z1). Therefore, even if the fixation between the drive shaft 15 and the movable iron core 23 is damaged, the drive shaft 15 can move in the contact direction (Z1) together with the movable iron core 23. As a result, in the electromagnetic relay 1, the movable contacts 12 and 13 can contact the fixed contacts 10 and 11 even when the fixation between the drive shaft 15 and the movable iron core 23 is damaged.

Figure 12:
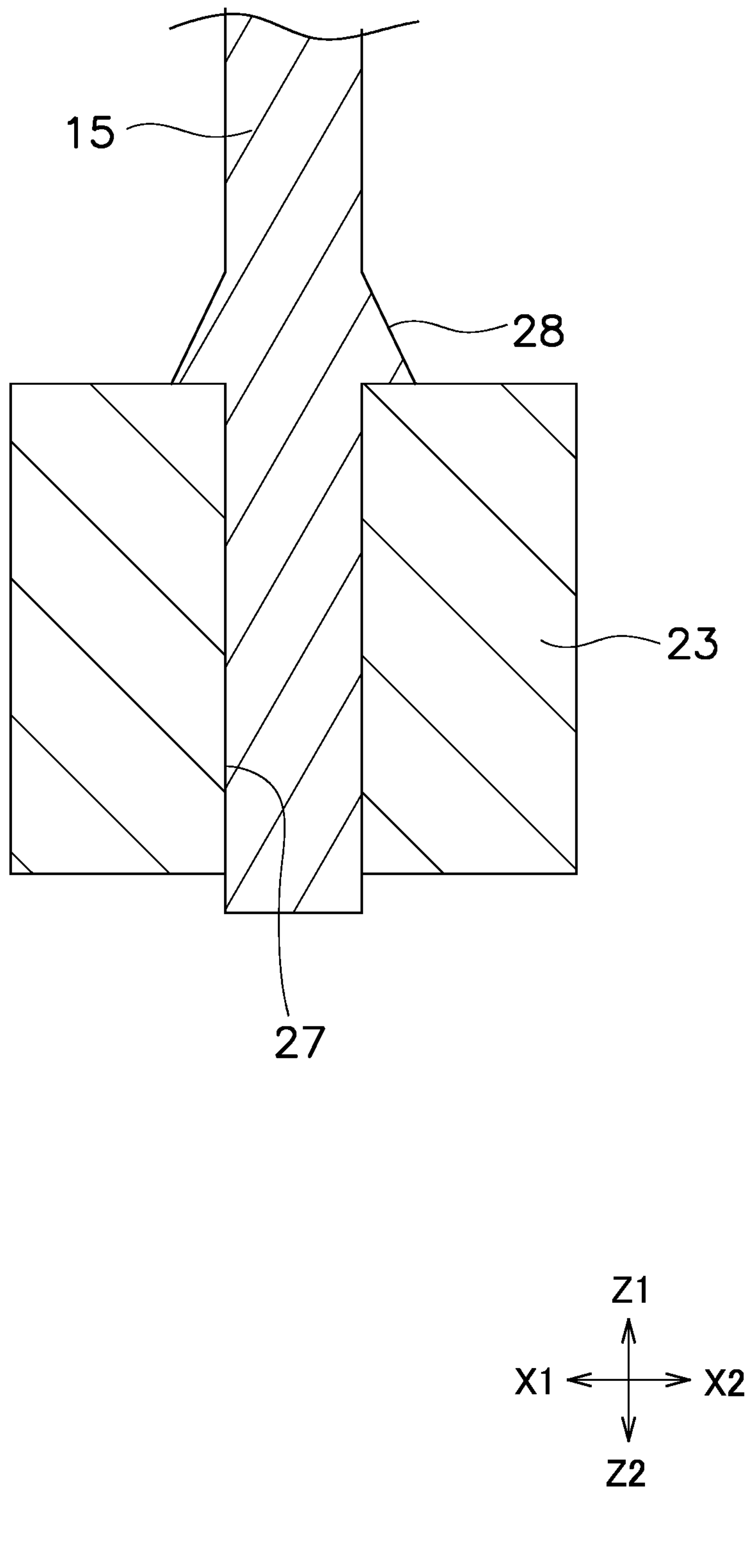
FIG. 12 is a section view showing a stopper according to a first modified example of the second embodiment.

Note that the shape of the stopper 28 is not limited to that described above, and may be changed. For example, FIG. 12 is a diagram showing the stopper 28 according to a first modified example of the second embodiment. As shown in FIG. 12, the stopper 28 may have a shape in which the external shape of the stopper 28 increases toward the separation direction (Z2).

Figure 13:
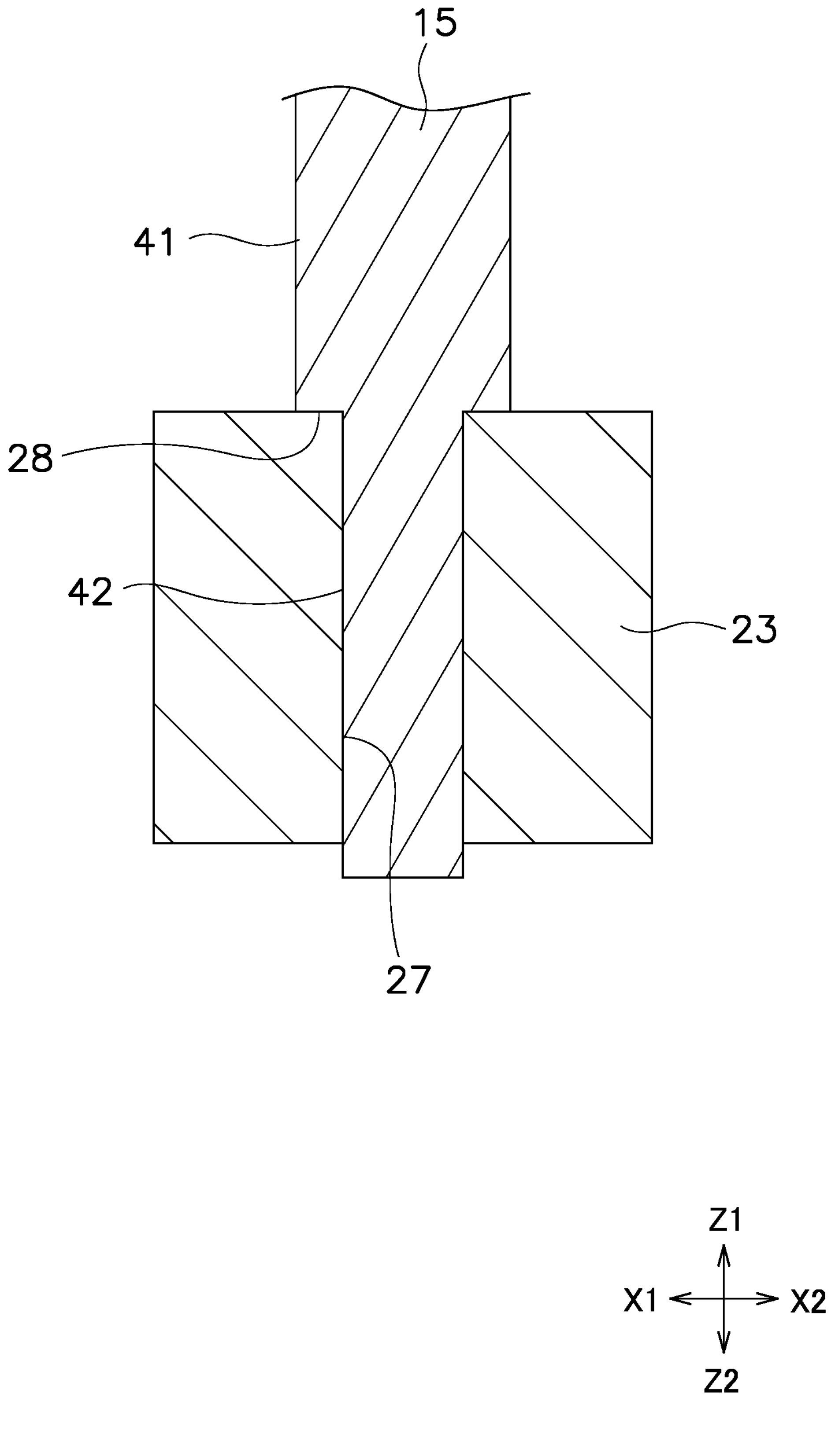
FIG. 13 is a section view showing a stopper according to a second modified example of the second embodiment.

FIG. 13 shows the stopper 28 according to a second modified example of the second embodiment. As shown in FIG. 13, the drive shaft 15 may include a first shaft 41 and a second shaft 42. An outer diameter of the first shaft 41 may be larger than an outer diameter of the second shaft 42. The second shaft 42 may be disposed in the shaft hole 27. The outer diameter of the first shaft 41 may be larger than the inner diameter of the shaft hole 27. The stopper 28 may be a step between the first shaft 41 and the second shaft 42.

Figure 14:
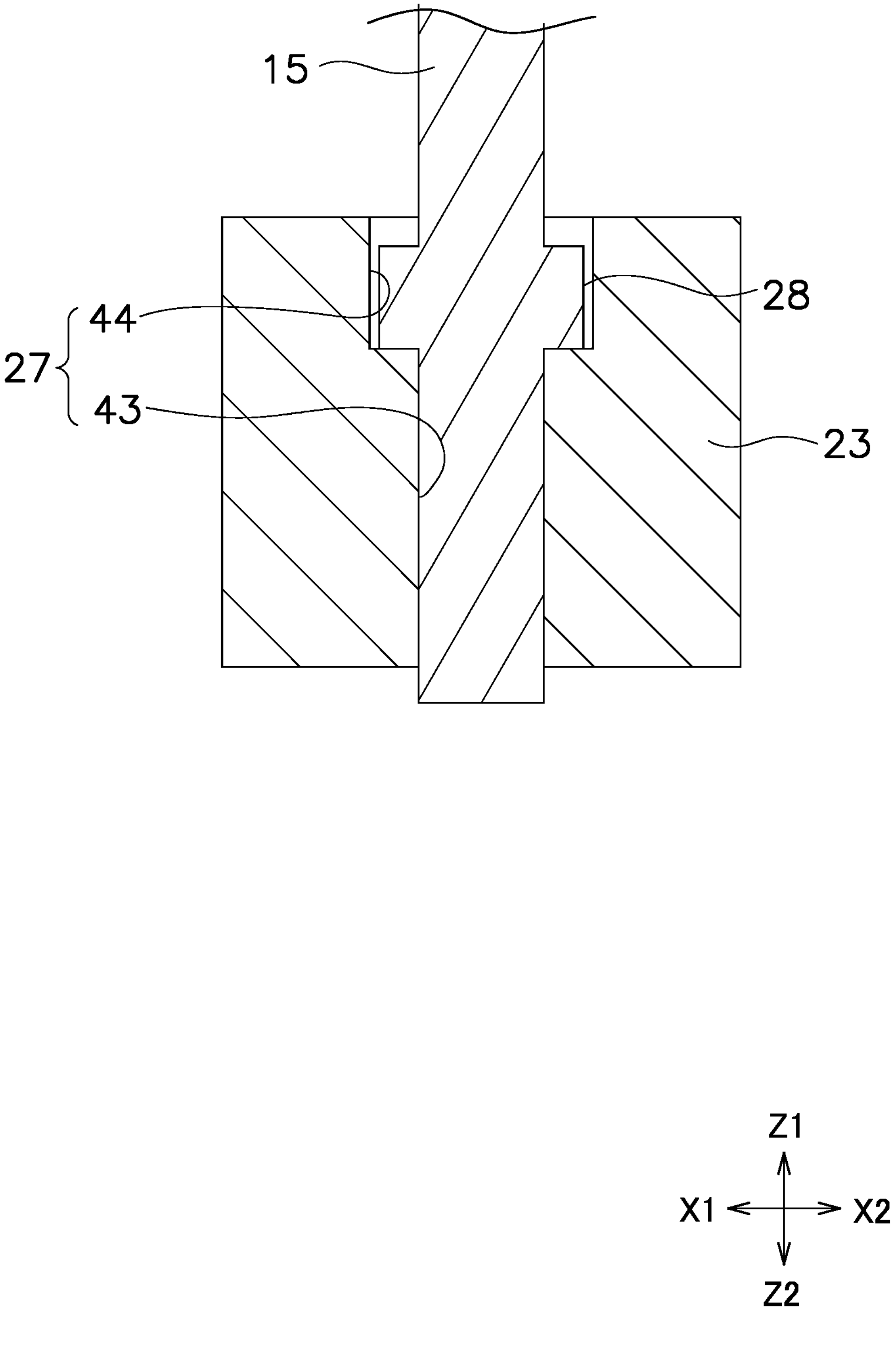
FIG. 14 is a section view showing a stopper according to a third modified example of the second embodiment.

FIG. 14 is a diagram showing the stopper 28 according to a third modified example of the second embodiment. As shown in FIG. 14, the shaft hole 27 may include a first hole segment 43 and a second hole segment 44. The first hole segment 43 may extend in the moving direction (Z1, Z2). The second hole segment 44 may be disposed in the contact direction (Z1) with respect to the first hole segment 43. The second hole segment 44 may extend in the moving direction (Z1, Z2) and communicate with the first hole segment 43. An inner diameter of the second hole segment 44 may be larger than an inner diameter of the first hole segment 43. The drive shaft 15 may extend through the first hole segment 43. The outer shape of the stopper 28 may be larger than the inner diameter of the first hole segment 43 but may be smaller than the inner diameter of the second hole segment 44. The stopper 28 may be disposed in the second hole segment 44.

Figure 15:
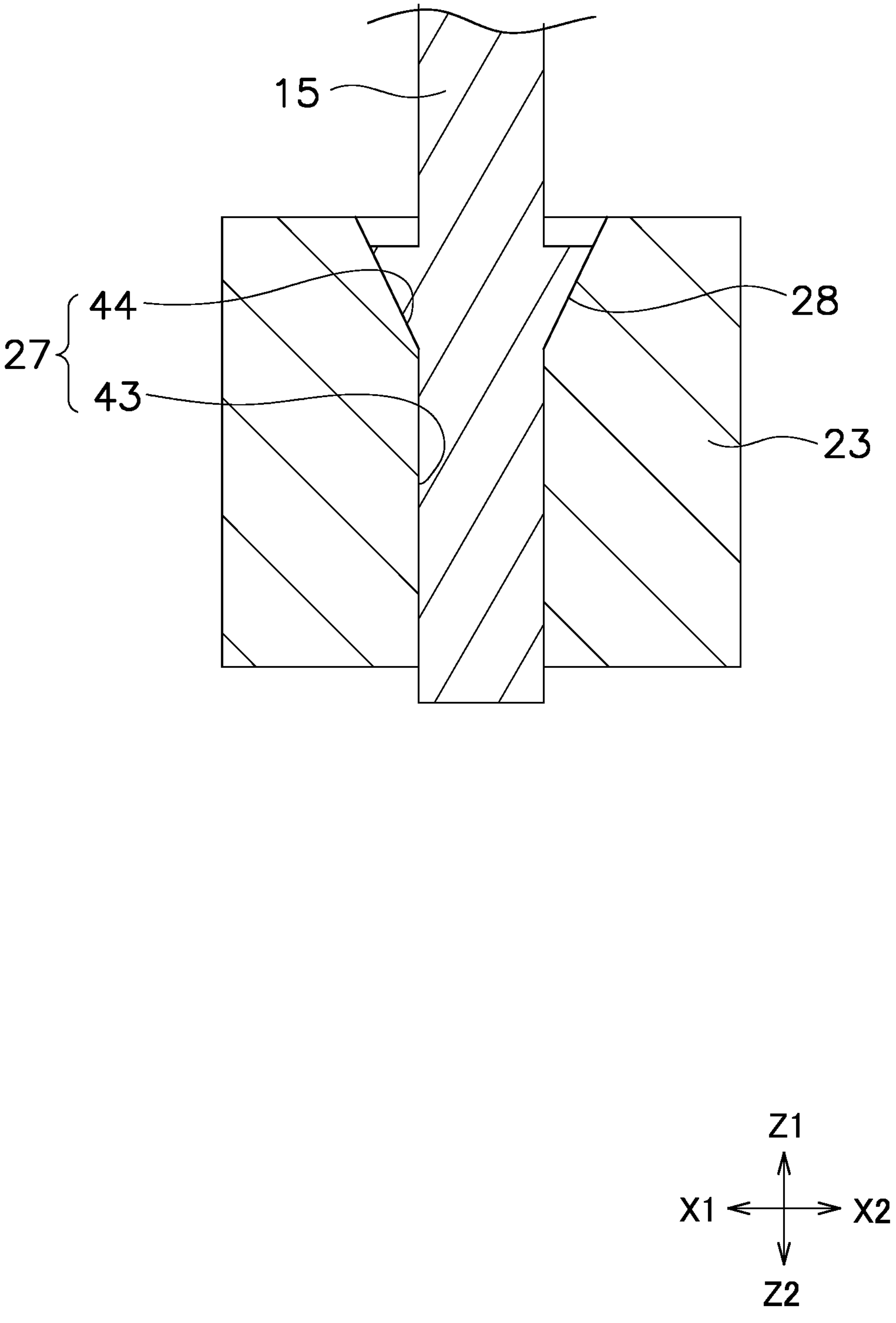
FIG. 15 is a section view showing a stopper according to a fourth modified example of the second embodiment.

FIG. 15 is a diagram showing the stopper 28 according to a fourth modified example of the second embodiment. As shown in FIG. 15, the inner diameter of the second hole segment 44 may expand toward the contact direction (Z1).

The stopper 28 may have a shape along an inner surface of the second hole segment 44. That is, the outer shape of the stopper 28 may expand toward the contact direction (Z1).

Figure 16:
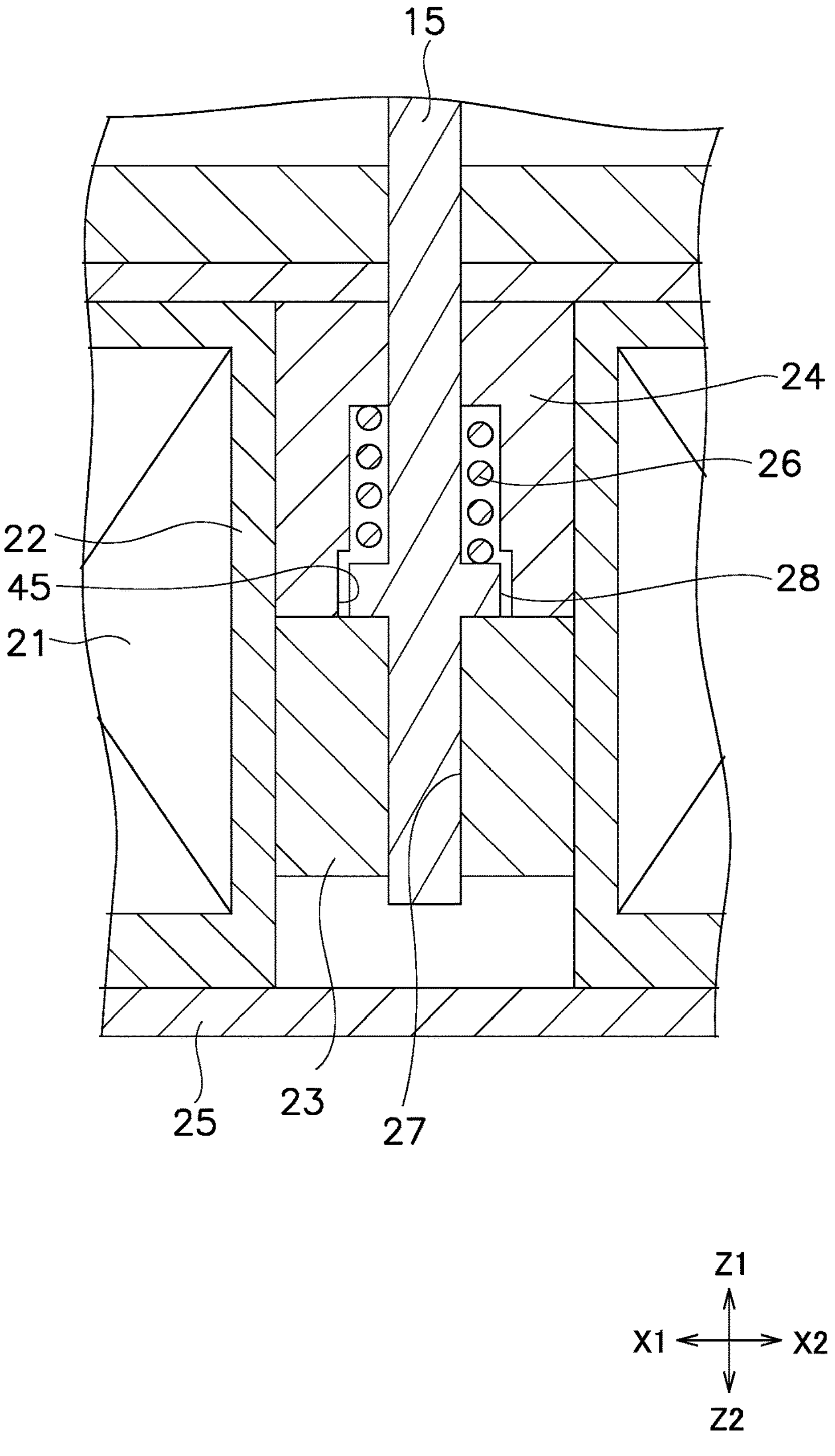
FIG. 16 is a section view showing a stopper according to a fifth modified example of the second embodiment.

FIG. 16 is a diagram showing the stopper 28 according to a fifth modified example of the second embodiment. When the movable contact piece 8 is at the closed position, the movable iron core 23 contacts the fixed iron core 24. As shown in FIG. 16, the fixed iron core 24 may include a recess 45. When the movable contact piece 8 is at the closed position, the stopper 28 may be located in the recess 45.

Figure 17:
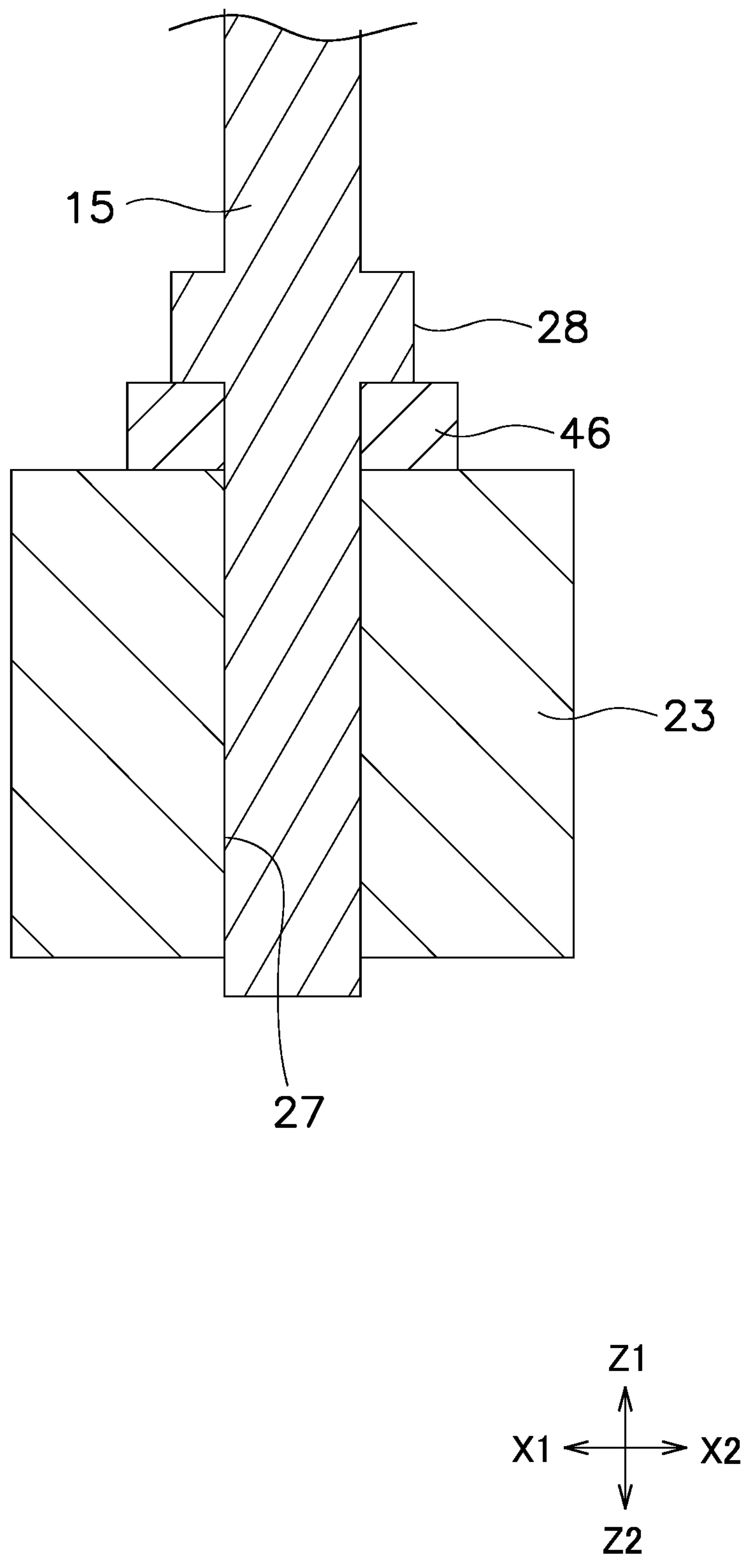
FIG. 17 is a section view showing a stopper according to a sixth modified example of the second embodiment.

FIG. 17 is a diagram showing the stopper 28 according to a sixth modified example of the second embodiment. As shown in FIG. 17, the electromagnetic relay 1 may further include an intermediate member 46. The intermediate member 46 may be provided separately from the stopper 28 and may be sandwiched between the stopper 28 and the movable iron core 23. The intermediate member 46 may be made of a different material from the stopper 28. For example, the stopper may be made of metal and the intermediate member 46 may be made of resin. Alternatively, the stopper may be made of metal and the intermediate member 46 may be made of a softer metal than the stopper.

Figure 18A:
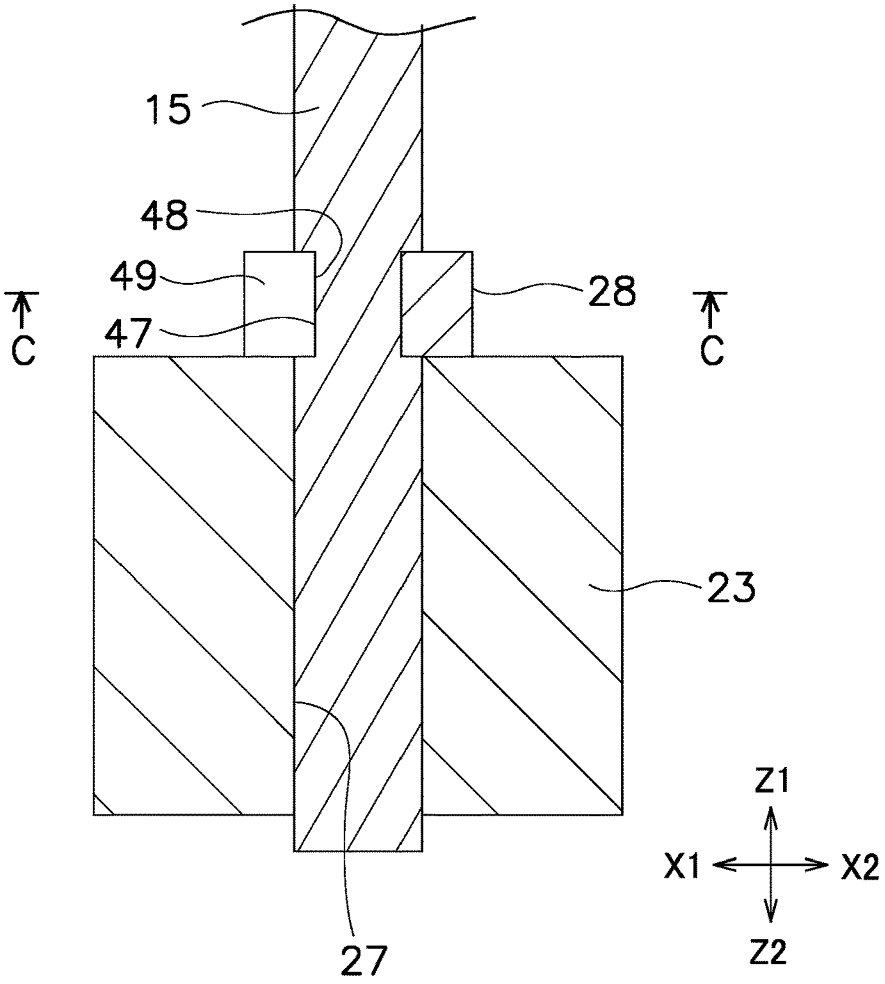
FIG. 18A is a section view showing a stopper according to a seventh modified example of the second embodiment.
Figure 18B:
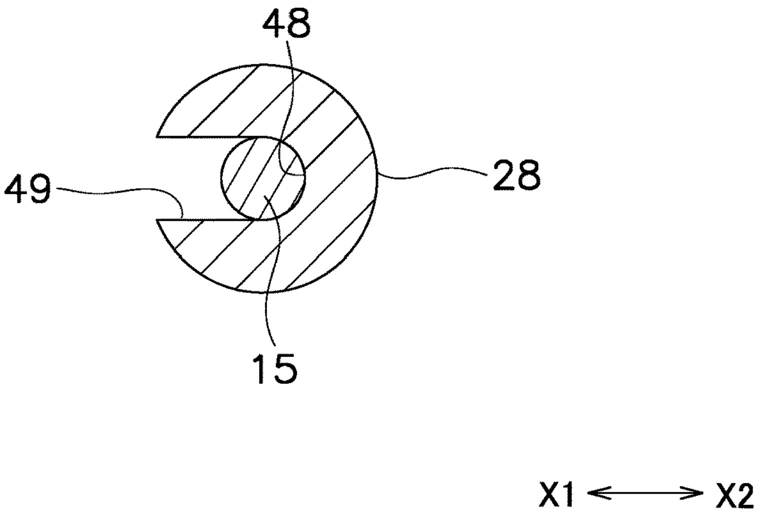
FIG. 18B is a section view showing the stopper according to the seventh modified example of the second embodiment.

FIGS. 18A and 18B are diagrams showing the stopper 28 according to a seventh modified example of the second embodiment. FIG. 18B is a section view taken along line CC in FIG. 18A. The stopper 28 may be provided separately from the drive shaft 15, as shown in FIG. 18A. The drive shaft 15 may include a groove 47. The stopper 28 may be attached to the drive shaft 15 by engaging with the groove 47. As shown in FIG. 18B, stopper 28 may include a hole 48 and a slit 49 communicating with the hole 48. The slit 49 may extend in the lateral direction (X1, X2). The stopper 28 may be attached to the drive shaft 15 in the lateral direction (X1, X2) through the slit 49.

Figure 19A:
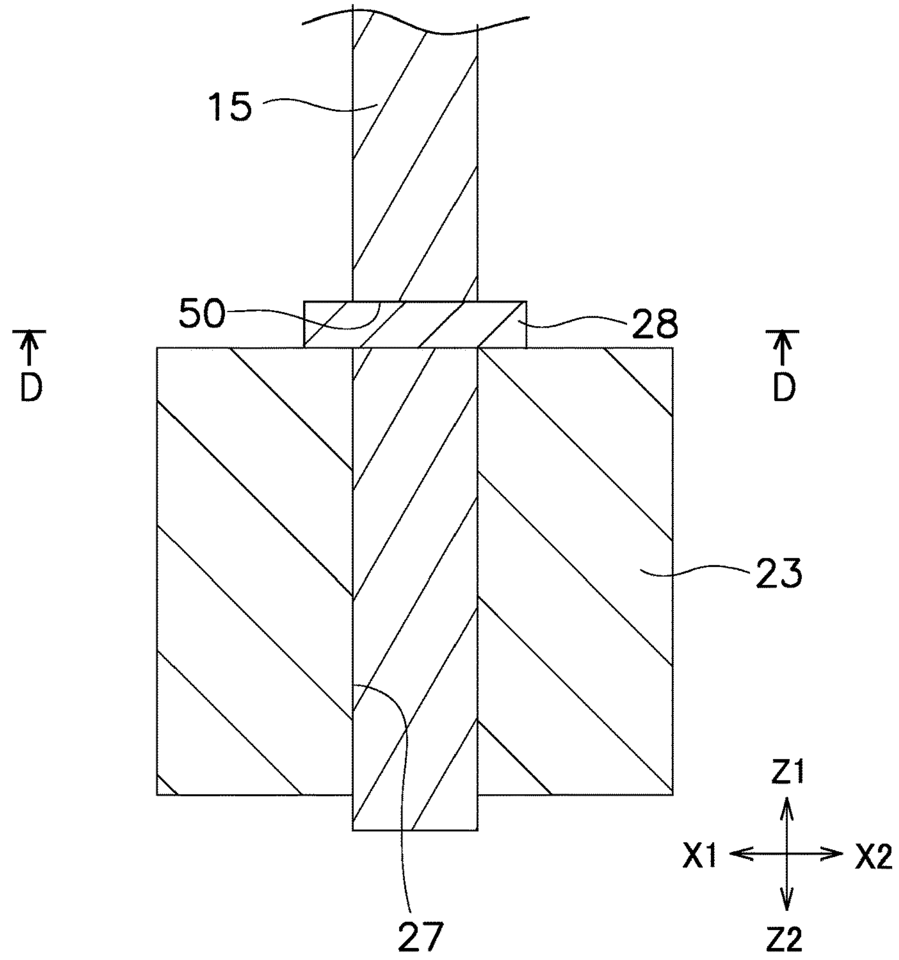
FIG. 19A is a section view showing a stopper according to an eighth modified example of the second embodiment.
Figure 19B:
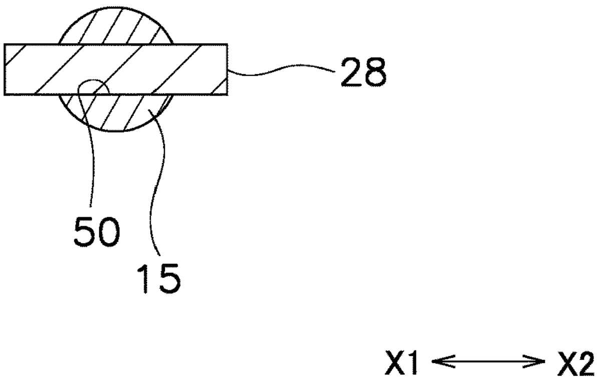
FIG. 19B is a section view showing the stopper according to the eighth modified example of the second embodiment.

FIGS. 19A and 19B are diagrams showing the stopper 28 according to an eighth modified example of the second embodiment. FIG. 19B is a section view along line DD in FIG. 19A. As shown in FIGS. 19A and 19B, the drive shaft 15 may include a hole 50 extending in the lateral direction (X1, X2). The stopper 28 may be inserted into the hole 50.

Figure 20:
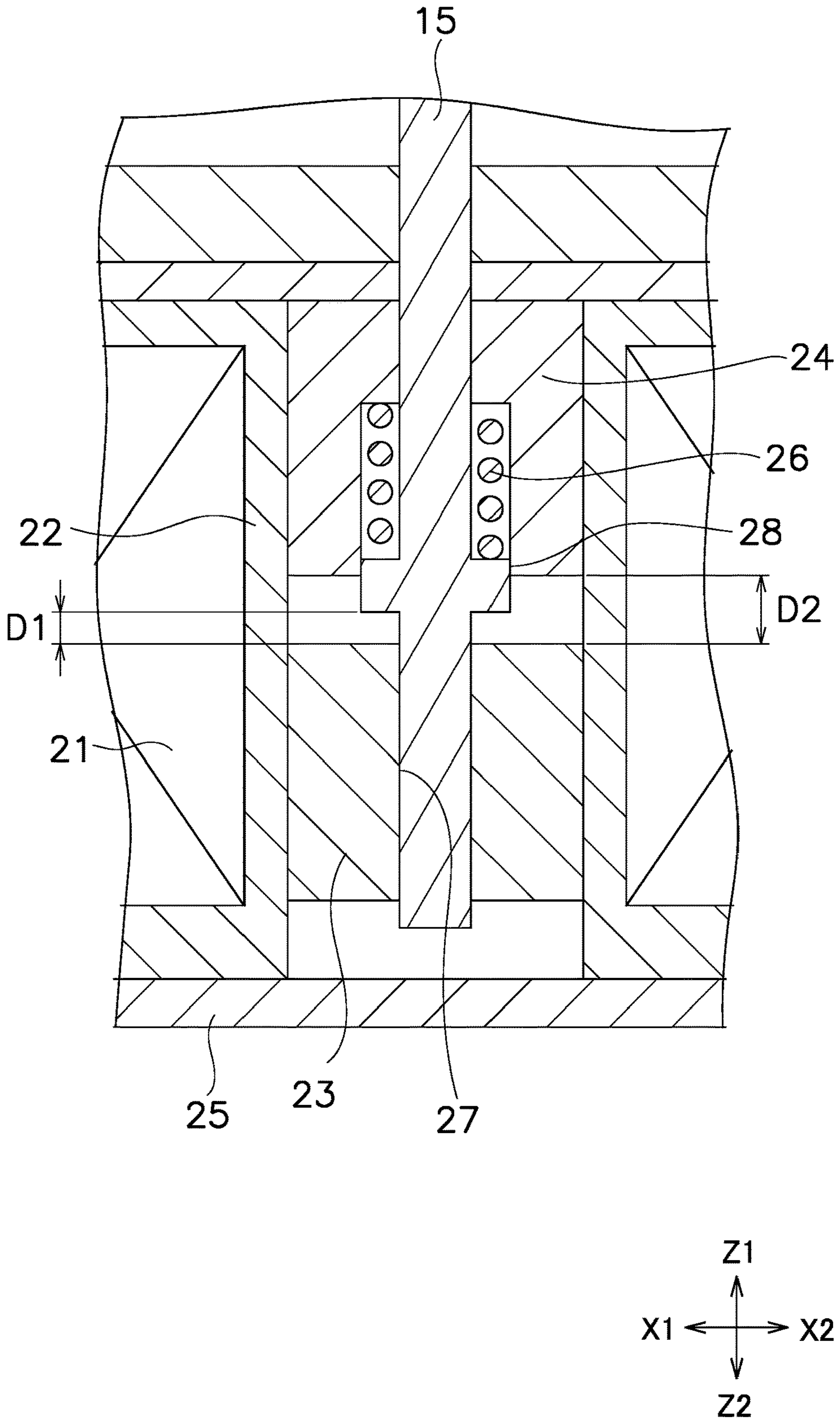
FIG. 20 is a section view showing a stopper according to a ninth modified example of the second embodiment.

FIG. 20 is a diagram showing the stopper 28 according to a ninth modified example of the second embodiment. As shown in FIG. 20, the stopper 28 may be separated from the movable iron core 23 in the contact direction (Z1). FIG. 20 shows the positions of the drive shaft 15 and the movable iron core 23 when the movable contacts 12 and 13 contact the fixed contacts 10 and 11. As shown in FIG. 20, a distance D1 between the stopper 28 and the movable iron core 23 in the moving direction (Z1, Z2) may be smaller than a movable range D2 of the movable iron core 23 in the contact direction (Z1) after the movable contacts 12 and 13 contacts the fixed contacts 10 and 11. The movable range D2 of the movable iron core 23 is a distance between the movable iron core 23 and the fixed iron core 24 in the moving direction (Z1, Z2).

In this case, even if the fixation between the drive shaft 15 and the movable iron core 23 is damaged, the stopper 28 restricts the movement of the movable iron core 23 in the contact direction (Z1). Therefore, the drive shaft 15 moves in the contact direction (Z1) together with the movable iron core 23. At that time, the drive shaft 15 moves in the contact direction (Z1) by a distance (D2-D1) corresponding to the difference between the distance D1 between the stopper 28 and the movable iron core 23 and the movable range D2 of the movable iron core 23. Thereby, a contact force can be obtained between the movable contacts 12 and 13 and the fixed contacts 10 and 11 by compressing the contact spring 26.

Figure 21:
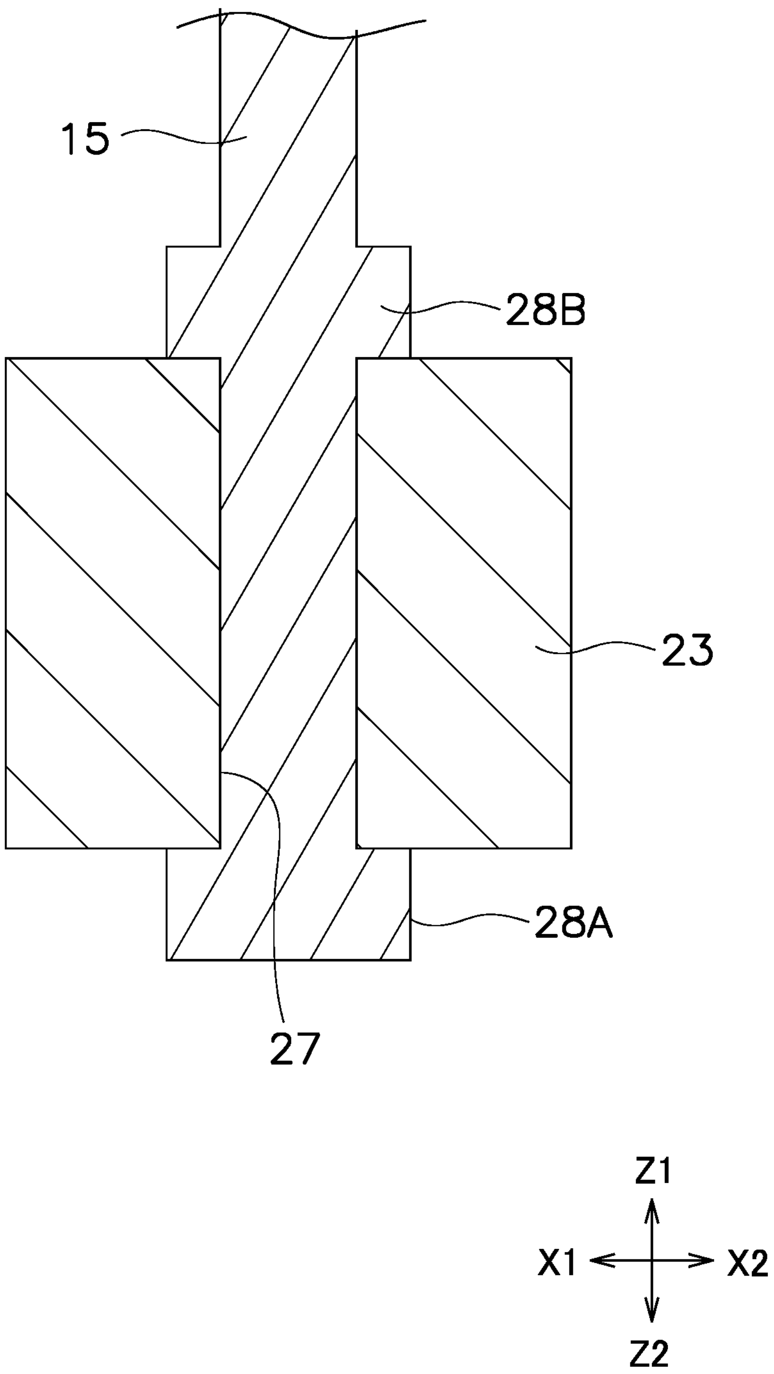
FIG. 21 is a section view showing a stopper according to a third embodiment.

Next, an electromagnetic relay 1 according to a third embodiment will be described. FIG. 21 is a section view showing the drive shaft 15 and the movable iron core 23 of the electromagnetic relay 1 according to the third embodiment. As shown in FIG. 21, the electromagnetic relay 1 according to the third embodiment includes a first stopper portion 28A and a second stopper portion 28B. The first stopper portion 28A is disposed in the separation direction (Z2) with respect to the movable iron core 23, like the stopper 28 according to the first embodiment. The second stopper portion 28B is disposed in the contact direction (Z1) with respect to the movable iron core 23, like the stopper 28 according to the second embodiment. Other configurations of the electromagnetic relay 1 according to the third embodiment are the same as those of the electromagnetic relay 1 according to the first embodiment.

In the electromagnetic relay 1 according to the third embodiment, when the fixation between the drive shaft 15 and the movable iron core 23 is damaged, the first stopper portion 28A restricts the movement of the movable iron core 23 in the separation direction (Z2) with respect to the drive shaft 15. Therefore, even if the fixation between the drive shaft 15 and the movable iron core 23 is damaged, the drive shaft 15 can move in the separation direction (Z2) together with the movable iron core 23. Further, when the fixation between the drive shaft 15 and the movable iron core 23 is damaged, the second stopper portion 28B restricts the movement of the movable iron core 23 in the contact direction (Z1) with respect to the drive shaft 15. Therefore, even if the fixation between the drive shaft 15 and the movable iron core 23 is damaged, the drive shaft 15 can move in the contact direction (Z1) together with the movable iron core 23. As a result, in the electromagnetic relay 1, the movable contacts 12 and 13 and the fixed contacts 10 and 11 can be opened and closed even when the fixation between the drive shaft 15 and the movable iron core 23 is damaged.

Figure 22:
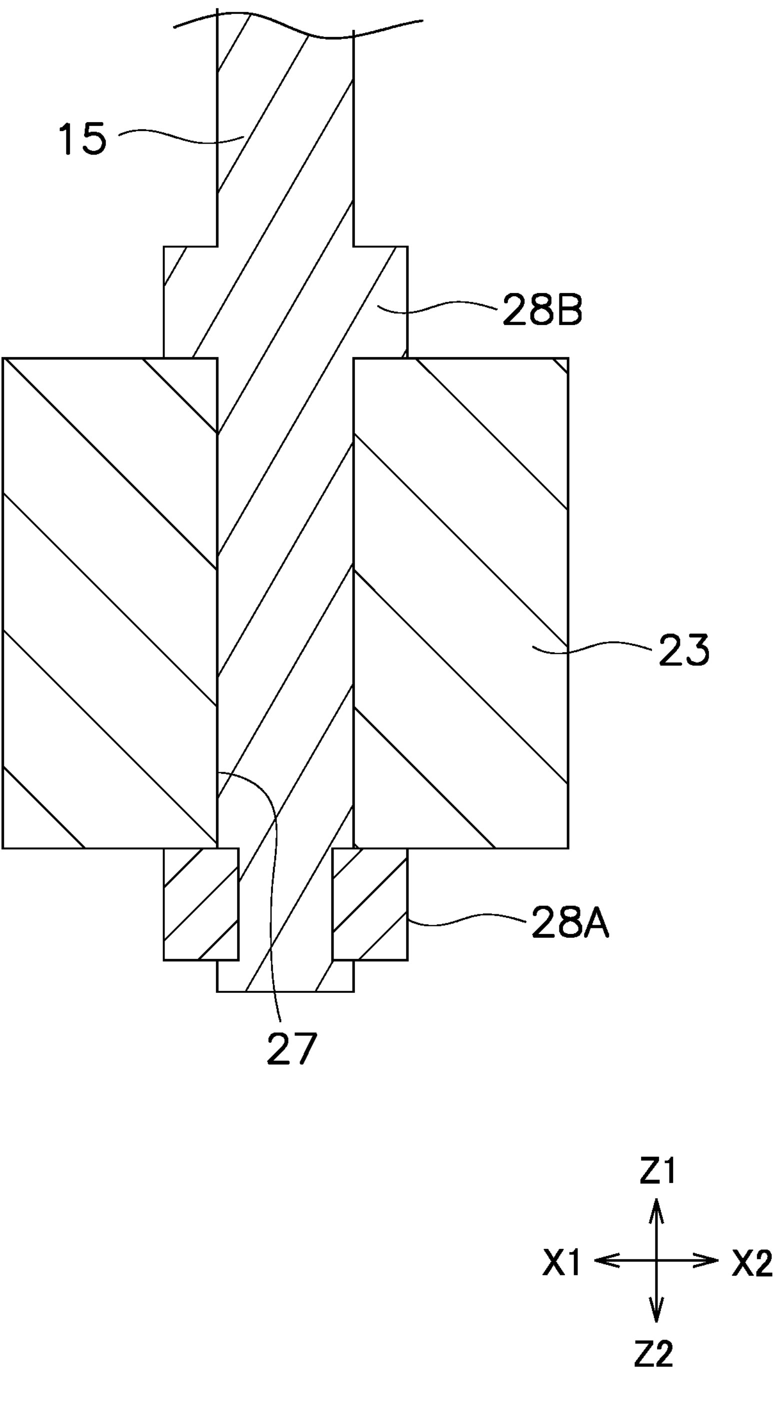
FIG. 22 is a section view showing a stopper according to a first modified example of the third embodiment.
Figure 23:
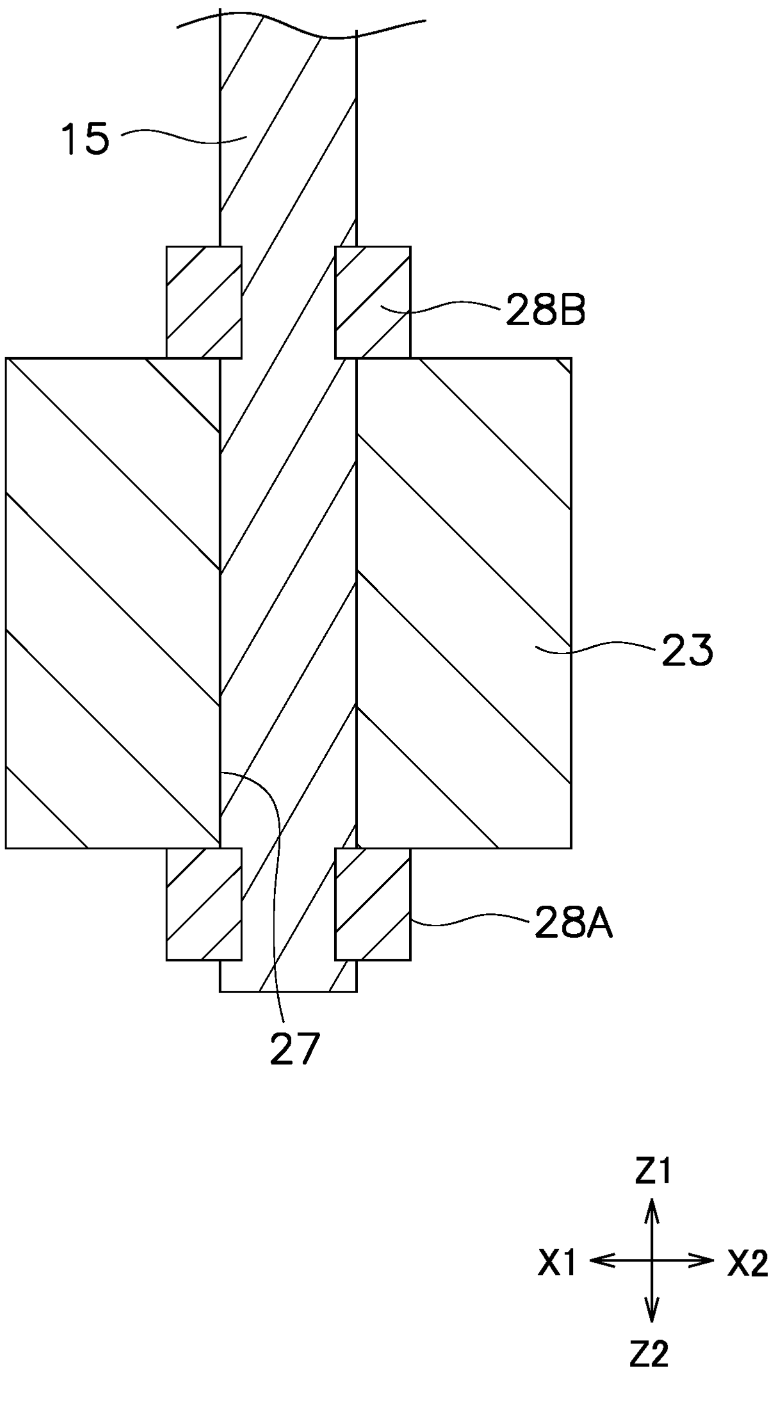
FIG. 23 is a section view showing a stopper according to a second modified example of the third embodiment.

Note that the stoppers 28A and 28B are not limited to the shapes described above, and may be modified. For example, FIG. 22 is a diagram showing the stoppers 28A and 28B according to a first modified example of the third embodiment. As shown in FIG. 22, the first stopper portion 28A may be provided separately from the drive shaft 15, and the second stopper portion 28B may be integrated with the drive shaft 15. Alternatively, conversely, the first stopper portion 28A may be integrated with the drive shaft 15, and the second stopper portion 28B may be provided separately from the drive shaft 15. FIG. 23 is a diagram showing the stoppers 28A and 28B according to a second modified example of the third embodiment. As shown in FIG. 23, both the first stopper portion 28A and the second stopper portion 28B may be provided separately from the drive shaft 15.

Figure 24:
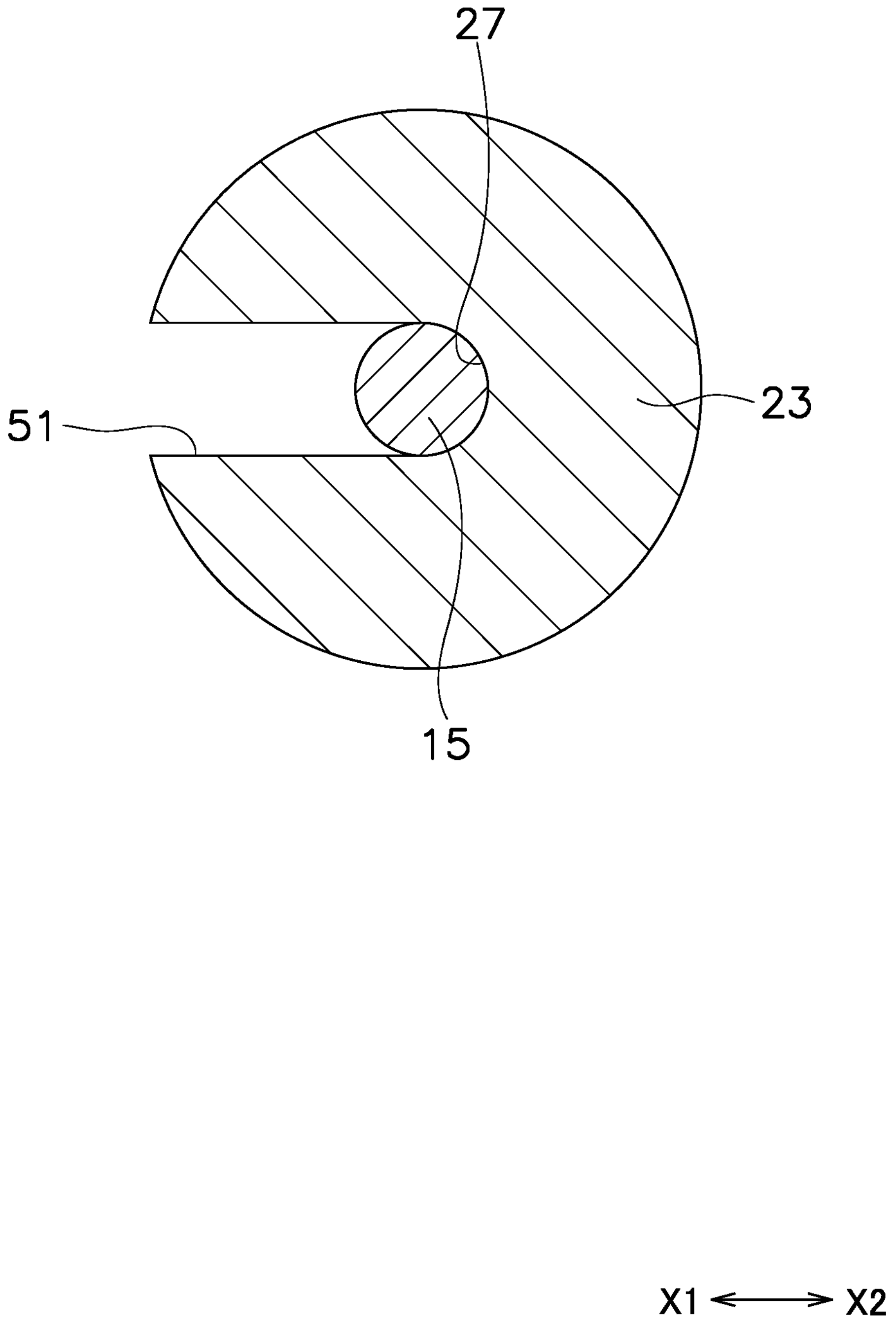
FIG. 24 is a section view showing a movable iron core according to a third modified example of the third embodiment.

FIG. 24 is a diagram showing the movable iron core 23 according to a third modified example of the third embodiment. FIG. 24 shows a cross section of the movable iron core 23 viewed from the moving direction (Z1, Z2). As shown in FIG. 24, the movable iron core 23 may include a slit 51 communicating with the shaft hole 27. The slit 51 may extend in the moving direction (Z1, Z2) and the lateral direction (X1, X2). The slit 51 may extend through the movable iron core 23 in the moving direction (Z1, Z2). In this case, the drive shaft 15 can be attached to the movable iron core 23 through the slit 51. Therefore, even if both the first stopper portion 28A and the second stopper portion 28B are integral with the drive shaft 15 as shown in FIG. 21, the drive shaft 15 can be easily attached to the movable iron core 23.

Figure 25:
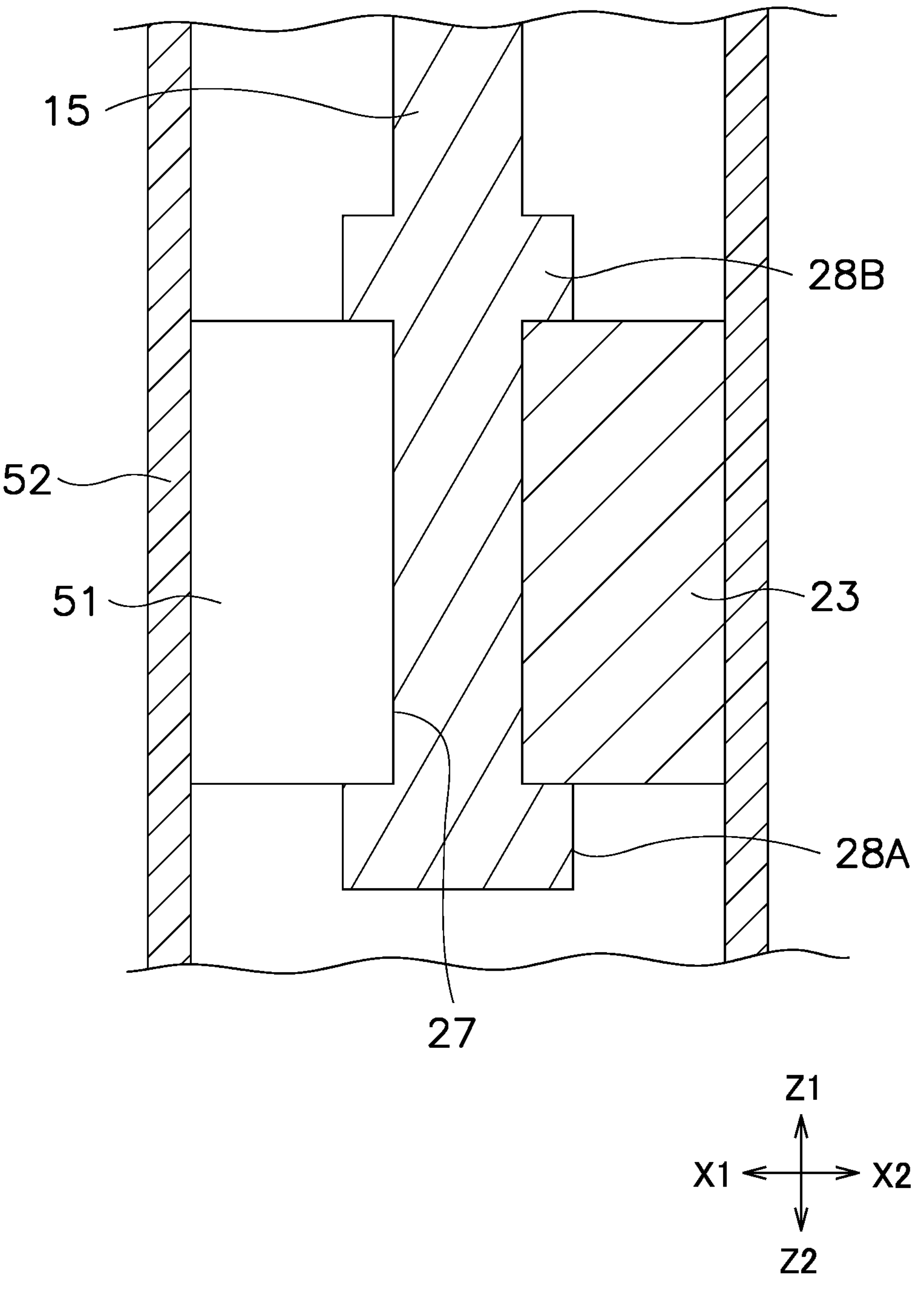
FIG. 25 is a section view showing a stopper according to a fourth modified example of the third embodiment.

FIG. 25 is a diagram showing the stoppers 28A and 28B according to a fourth modified example of the third embodiment. In a case that the movable iron core 23 includes the slit 51 as described above, the electromagnetic relay 1 may include a guide 52 as shown in FIG. 25. The guide 52 may extend in the moving direction (Z1, Z2). The movable iron core 23 may be disposed in the guide 52. The guide 52 may guide the movement of the movable iron core 23 in the moving direction (Z1, Z2).

Figure 26:
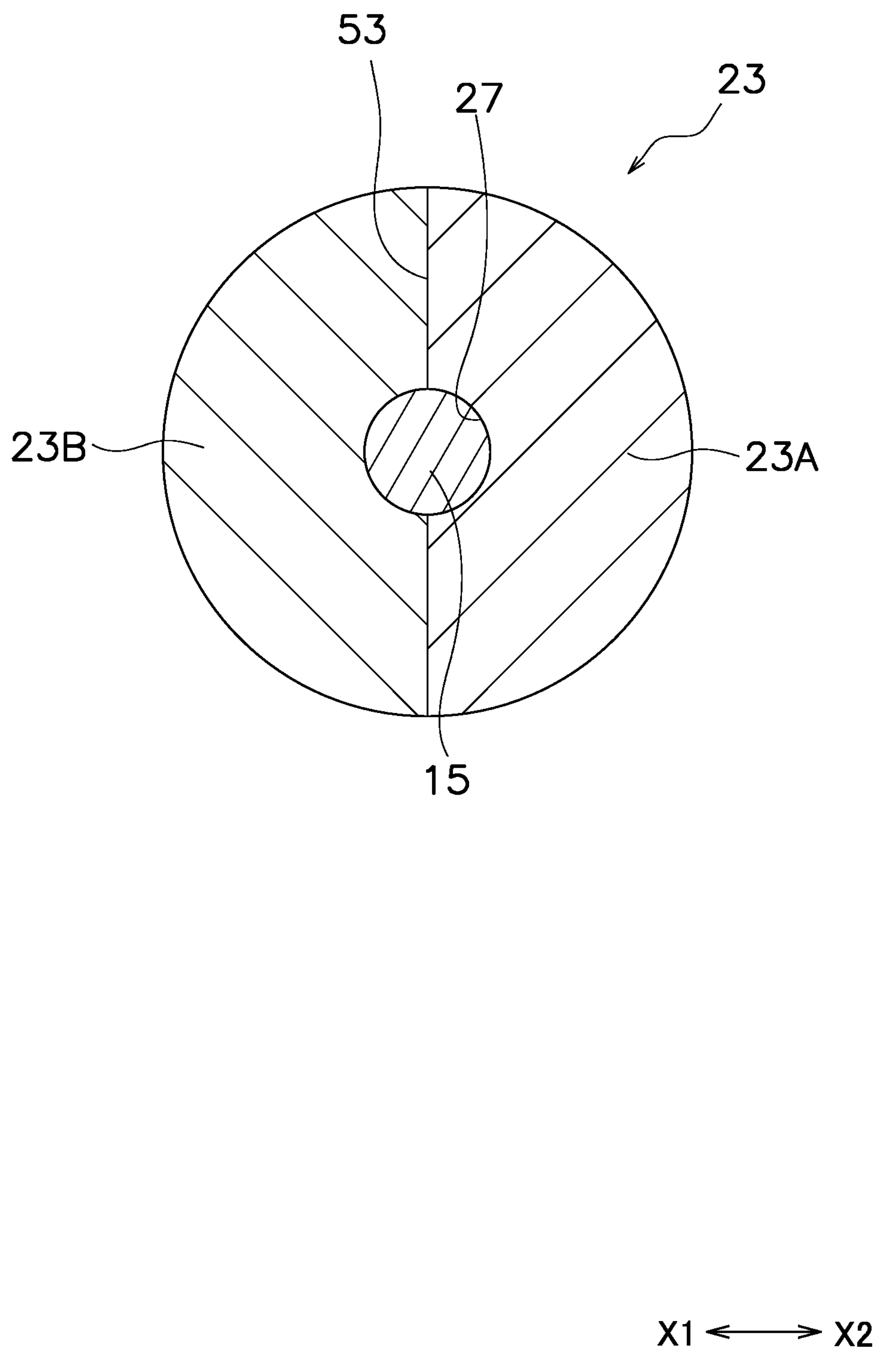
FIG. 26 is a section view showing a movable iron core according to a fifth modified example of the third embodiment.

FIG. 26 is a diagram showing the movable iron core 23 according to a fifth modified example of the third embodiment. FIG. 26 shows a cross section of the movable iron core 23 viewed from the moving direction (Z1, Z2). As shown in FIG. 26, the movable iron core 23 may include a plurality of split bodies 23A and 23B divided each other along a dividing plane 53 extending through the shaft hole 27. The dividing plane 53 may extend through a center of the movable iron core 23. The dividing plane 53 may extend in the moving direction (Z1, Z2) and the lateral direction (X1, X2). The movable iron core 23 may include a first split body 23A and a second split body 23B. In this case, by sandwiching the drive shaft 15 between the first split body 23A and the second split body 23B and fixing the first split body 23A and the second split body 23B to each other, the drive shaft 15 can be attached to the movable iron core 23. Therefore, even if both the first stopper portion 28A and the second stopper portion 28B are integral with the drive shaft 15 as shown in FIG. 21, the drive shaft 15 can be easily attached to the movable iron core 23. Note that the number of split bodies is not limited to two, and may be more than two.

The shape of the first stopper portion 28A is not limited to that described above, and may be changed. For example, the first stopper portion 28A may have the shapes of the first to seventh modified examples of the first embodiment. The second stopper portion 28B may have the shapes of the first to ninth modified examples of the second embodiment.

Figure 27:
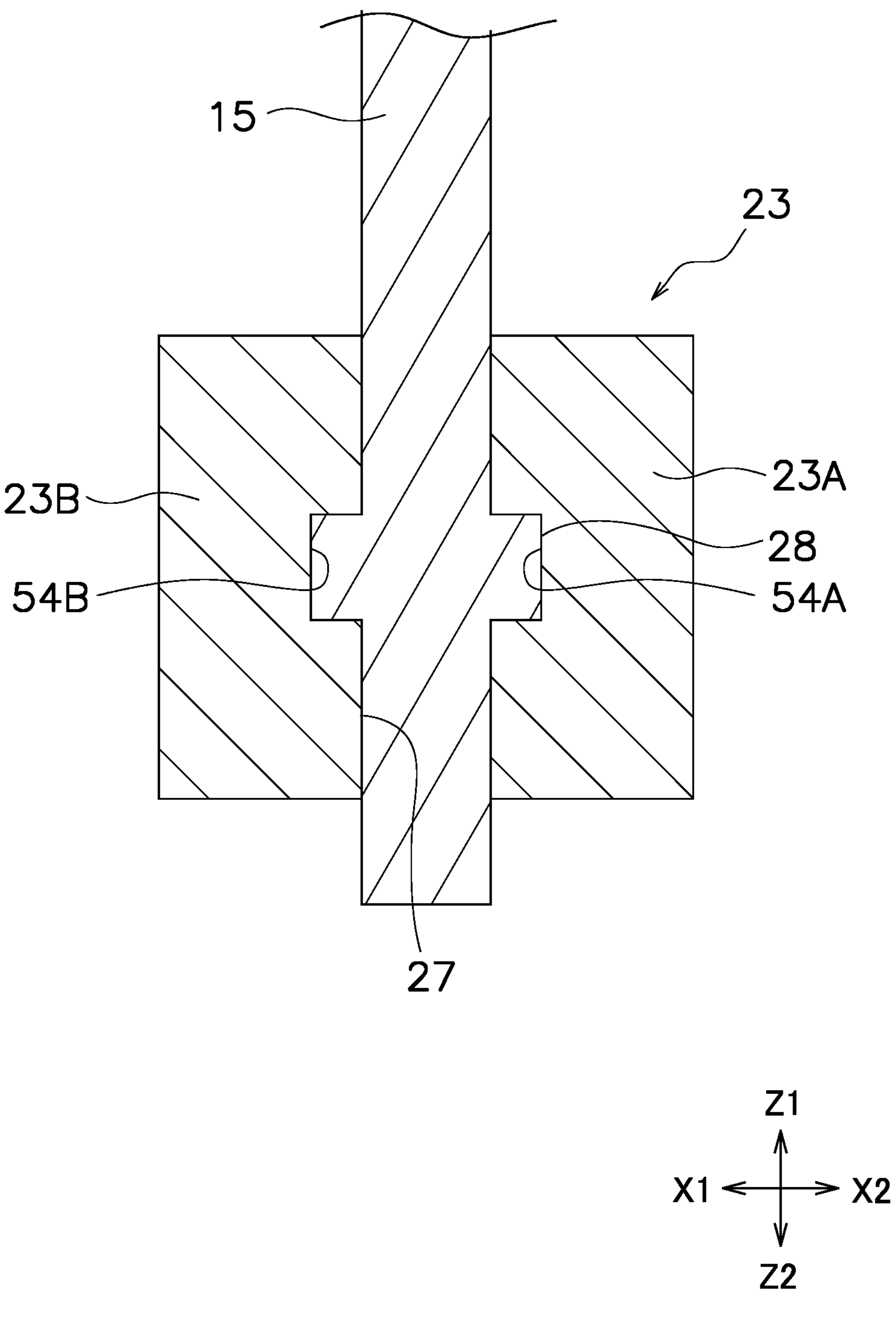
FIG. 27 is a section view showing a stopper according to a fourth embodiment.

Next, an electromagnetic relay 1 according to a fourth embodiment will be described. FIG. 27 is a section view showing the stopper 28 of the electromagnetic relay 1 according to the fourth embodiment. As shown in FIG. 27, in the electromagnetic relay 1 according to the forth embodiment, the stopper 28 is disposed in the movable iron core 23. The movable iron core 23 includes a plurality of split bodies 23A and 23B divided each other along a dividing plane extending through the shaft hole 27, as in the fifth modified example of the third embodiment.

Specifically, the movable iron core 23 includes a first split body 23A and a second split body 23B. The first split body 23A includes a first recess 54A in the shaft hole 27. The second split body 23B includes a second recess 54B in the shaft hole 27. The stopper 28 is disposed in the first recess 54A and the second recess 54B. The drive shaft 15 is attached to the movable iron core 23 by sandwiching the drive shaft 15 between the first split body 23A and the second split body 23B and fixing the first split body 23A and the second split body 23B to each other. Note that the number of split bodies is not limited to two, and may be more than two. Other configurations of the electromagnetic relay 1 according to the fourth embodiment are the same as those of the electromagnetic relay 1 according to the first embodiment.

In the electromagnetic relay 1 according to the fourth embodiment, when the fixation between the drive shaft 15 and the movable iron core 23 is damaged, the stopper 28 restricts the movement of the movable iron core 23 in the separation direction (Z2) with respect to the drive shaft 15. Therefore, even if the fixation between the drive shaft 15 and the movable iron core 23 is damaged, the drive shaft 15 can move in the separation direction (Z2) together with the movable iron core 23. Further, when the fixation between the drive shaft 15 and the movable iron core 23 is damaged, the stopper 28 restricts the movement of the movable iron core 23 with respect to the drive shaft 15 in the contact direction (Z1). Therefore, even if the fixation between the drive shaft 15 and the movable iron core 23 is damaged, the drive shaft 15 can move in the contact direction (Z1) together with the movable iron core 23. As a result, in the electromagnetic relay 1, the movable contacts 12 and 13 and the fixed contacts 10 and 11 can be opened and closed even when the fixation between the drive shaft 15 and the movable iron core 23 is damaged.

The shape of the stopper 28 of the electromagnetic relay 1 according to the fourth embodiment is not limited to the shape described above, and may be changed. The stopper 28 may have the same shape as any of the modified examples of the first to third embodiments described above.

Although one embodiment of the claimed invention has been described above, the claimed invention is not limited to the above-described embodiment, and various modified examples are possible without departing from the scope of the invention.

The structures of the contact device 3 and the drive device 4 are not limited to those of the above embodiment, and may be modified. For example, the number of the fixed contacts and the movable contacts is not limited to two, and may be more than two. The fixed contacts 10 and 11 may be integrated with the fixed terminals 6 and 7. The movable contacts 12 and 13 may be integrated with the movable contact piece 8. In the above embodiment, the movable contacts 12 and 13 contact the fixed contacts 10 and 11 by pushing the drive shaft 15 out of the drive device 4. However, the movable contacts 12 and 13 may contact the fixed contacts 10 and 11 by pulling the drive shaft 15 into the drive device 4. The lateral direction may be a direction perpendicular to the moving direction (Z1, Z2), and may be different from the lateral direction (X1, X2) in the above embodiment.

REFERENCE SIGNS LIST

10: First fixed contact, 12: First movable contact, 8: Movable contact piece, 15: Drive shaft, 21: Coil, 23: Movable iron core, 23A: First split body, 23B: Second split body, 27: Shaft hole, 28: Stopper, 28A: First stopper portion, 28B: Second stopper portion, 31: First hole segment, 32: Second hole segment, 34: Intermediate member, 43: First hole segment, 44: Second hole segment, 46: Intermediate member, 51: Slit

The invention claimed is:

1. An electromagnetic relay, comprising:
- a fixed contact;
- a movable contact that faces the fixed contact;
- a movable contact piece connected to the movable contact;
- a movable iron core that is movable in a moving direction including a contact direction in which the movable contact approaches the fixed contact and a separation direction in which the movable contact separates from the fixed contact, the movable iron core including a shaft hole extending in the moving direction;

a drive shaft connected to the movable contact piece, the drive shaft extending through the shaft hole, the drive shaft being fixed to the movable iron core;

a coil configured to generate a magnetic force to move the movable iron core in the moving direction; and a stopper connected to the drive shaft to restrict a movement of the movable iron core in the moving direction with respect to the drive shaft, wherein the stopper is located apart from the movable iron core in the moving direction, and a distance between the stopper and the movable iron core in the moving direction is smaller than a movable range of the movable iron core in the contact direction after the movable contact contacts the fixed contact.

2. An electromagnetic relay, comprising:

a fixed contact;

a movable contact that faces the fixed contact;

a movable contact piece connected to the movable contact;

a movable iron core that is movable in a moving direction including a contact direction in which the movable contact approaches the fixed contact and a separation direction in which the movable contact separates from the fixed contact, the movable iron core including a shaft hole extending in the moving direction;

a drive shaft connected to the movable contact piece, the drive shaft extending through the shaft hole, the drive shaft being fixed to the movable iron core;

a coil configured to generate a magnetic force to move the movable iron core in the moving direction; and a stopper connected to the drive shaft to restrict a movement of the movable iron core in the moving direction with respect to the drive shaft, wherein the stopper is disposed in the contact direction with respect to the movable iron core.

3. An electromagnetic relay, comprising:

a fixed contact;

a movable contact that faces the fixed contact;

a movable contact piece connected to the movable contact;

a movable iron core that is movable in a moving direction including a contact direction in which the movable contact approaches the fixed contact and a separation direction in which the movable contact separates from the fixed contact, the movable iron core including a shaft hole extending in the moving direction;

a drive shaft connected to the movable contact piece, the drive shaft extending through the shaft hole, the drive shaft being fixed to the movable iron core;

a coil configured to generate a magnetic force to move the movable iron core in the moving direction; and a stopper connected to the drive shaft to restrict a movement of the movable iron core in the moving direction with respect to the drive shaft, wherein the stopper includes a first stopper portion located in the separation direction with respect to the movable iron core, and a second stopper portion located in the contact direction with respect to the movable iron core.

* * * * *